United States Patent
Aron et al.

(10) Patent No.: US 10,684,879 B2
(45) Date of Patent: Jun. 16, 2020

(54) ARCHITECTURE FOR IMPLEMENTING A VIRTUALIZATION ENVIRONMENT AND APPLIANCE

(71) Applicant: Nutanix, Inc., San Jose, CA (US)

(72) Inventors: Mohit Aron, Saratoga, CA (US); Dheeraj Pandey, San Jose, CA (US); Ajeet Singh, San Jose, CA (US); Rishi Bhardwaj, San Jose, CA (US); Brent Chun, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/714,880

(22) Filed: Sep. 25, 2017

(65) Prior Publication Data

US 2018/0011732 A1 Jan. 11, 2018

Related U.S. Application Data

(63) Continuation of application No. 13/551,291, filed on Jul. 17, 2012, now Pat. No. 9,772,866.

(51) Int. Cl.
*G06F 9/455* (2018.01)

(52) U.S. Cl.
CPC ............ *G06F 9/45558* (2013.01); *G06F 2009/45579* (2013.01)

(58) Field of Classification Search
CPC ............ G06F 9/45558; G06F 2009/45579
See application file for complete search history.

(56) References Cited

U.S. PATENT DOCUMENTS

| | | | |
|---|---|---|---|
| 4,980,822 A | 12/1990 | Brantley, Jr. | |
| 6,834,386 B1 | 12/2004 | Douceur et al. | |
| 7,035,881 B2 | 4/2006 | Tummala et al. | |
| 7,360,034 B1 | 4/2008 | Muhlestein et al. | |
| 7,970,851 B2 | 6/2011 | Ponnappan et al. | |
| 8,089,795 B2 | 1/2012 | Rajan et al. | |
| 8,099,572 B1 | 1/2012 | Arora et al. | |
| 8,145,842 B2 | 3/2012 | Shiga | |

(Continued)

FOREIGN PATENT DOCUMENTS

WO WO 2010117294 10/2010

OTHER PUBLICATIONS

Final Office Action dated Feb. 11, 2019 for related U.S. Appl. No. 15/436,196, 7 pages.

(Continued)

*Primary Examiner* — Tuan C Dao
(74) *Attorney, Agent, or Firm* — Vista IP Law Group, LLP

(57) ABSTRACT

An improved architecture is provided which enables significant convergence of the components of a system to implement virtualization. The infrastructure is VM-aware, and permits scaled out converged storage provisioning to allow storage on a per-VM basis, while identifying I/O coming from each VM. The current approach can scale out from a few nodes to a large number of nodes. In addition, the inventive approach has ground-up integration with all types of storage, including solid-state drives. The architecture of the invention provides high availability against any type of failure, including disk or node failures. In addition, the invention provides high performance by making I/O access local, leveraging solid-state drives and employing a series of patent-pending performance optimizations.

20 Claims, 17 Drawing Sheets

(56) References Cited

U.S. PATENT DOCUMENTS

| | | |
|---|---|---|
| 8,194,674 B1 | 6/2012 | Pagel et al. |
| 8,407,265 B1 | 3/2013 | Scheer et al. |
| 8,413,146 B1 | 4/2013 | McCorkendale et al. |
| 8,438,346 B2 | 5/2013 | Gold |
| 8,539,484 B1 | 9/2013 | Offer |
| 8,549,518 B1 | 10/2013 | Aron et al. |
| 8,566,821 B2 | 10/2013 | Robinson et al. |
| 8,601,473 B1 | 12/2013 | Aron et al. |
| 8,683,153 B1 | 3/2014 | Long et al. |
| 8,850,130 B1 | 9/2014 | Aron et al. |
| 8,910,156 B1 | 12/2014 | Kenchammana-Hosekote et al. |
| 8,949,829 B1 | 2/2015 | Xing |
| 9,256,475 B1 | 2/2016 | Aron et al. |
| 9,772,866 B1 | 9/2017 | Aron et al. |
| 2002/0002448 A1 | 1/2002 | Kampe |
| 2002/0091574 A1 | 7/2002 | Lefebvre et al. |
| 2002/0124137 A1 | 9/2002 | Ulrich et al. |
| 2002/0161889 A1 | 10/2002 | Gamache et al. |
| 2002/0184239 A1 | 12/2002 | Mosher et al. |
| 2003/0046369 A1 | 3/2003 | Sim et al. |
| 2003/0154236 A1 | 8/2003 | Dar et al. |
| 2003/0158873 A1 | 8/2003 | Sawdon et al. |
| 2003/0202486 A1 | 10/2003 | Anton et al. |
| 2004/0107227 A1 | 6/2004 | Michael |
| 2004/0139128 A1 | 7/2004 | Becker et al. |
| 2004/0148380 A1 | 7/2004 | Meyer |
| 2004/0158566 A1 | 8/2004 | Fay, Jr. et al. |
| 2004/0221089 A1 | 11/2004 | Sato et al. |
| 2005/0027956 A1 | 2/2005 | Tormasov et al. |
| 2005/0065985 A1 | 3/2005 | Tummala et al. |
| 2005/0102672 A1 | 5/2005 | Brothers |
| 2006/0005189 A1 | 1/2006 | Vega et al. |
| 2006/0106999 A1 | 5/2006 | Baldwin |
| 2006/0112093 A1 | 5/2006 | Lightstone et al. |
| 2006/0123062 A1 | 6/2006 | Bobbitt et al. |
| 2006/0126918 A1 | 6/2006 | Oohashi et al. |
| 2006/0155930 A1 | 7/2006 | Birrell |
| 2006/0179261 A1 | 8/2006 | Rajan |
| 2007/0050767 A1 | 3/2007 | Grobman et al. |
| 2007/0156955 A1 | 7/2007 | Royer, Jr. et al. |
| 2007/0239942 A1 | 10/2007 | Rajwar et al. |
| 2007/0244938 A1 | 10/2007 | Michael et al. |
| 2008/0183973 A1 | 7/2008 | Aguilera et al. |
| 2008/0189468 A1 | 8/2008 | Schmidt |
| 2008/0189700 A1 | 8/2008 | Schmidt et al. |
| 2008/0196043 A1 | 8/2008 | Feinleib et al. |
| 2008/0201709 A1 | 8/2008 | Hodges |
| 2008/0222234 A1 | 9/2008 | Marchand |
| 2008/0244028 A1 | 10/2008 | Le et al. |
| 2008/0263407 A1 | 10/2008 | Yamamoto |
| 2008/0270564 A1 | 10/2008 | Rangegowda et al. |
| 2008/0282047 A1 | 11/2008 | Arakawa et al. |
| 2009/0172165 A1 | 7/2009 | Rokuhara et al. |
| 2009/0172660 A1 | 7/2009 | Klotz et al. |
| 2009/0183159 A1 | 7/2009 | Michael et al. |
| 2009/0222542 A1 | 9/2009 | Miyajima |
| 2009/0259759 A1 | 10/2009 | Miyajima |
| 2009/0276467 A1 | 11/2009 | Scholtes et al. |
| 2009/0300660 A1 | 12/2009 | Solomon et al. |
| 2009/0313391 A1 | 12/2009 | Watanabe |
| 2010/0037243 A1 | 2/2010 | Mo et al. |
| 2010/0070470 A1 | 3/2010 | Milencovici et al. |
| 2010/0070725 A1 | 3/2010 | Prahlad et al. |
| 2010/0106907 A1 | 4/2010 | Noguchi |
| 2010/0115174 A1 | 5/2010 | Akyol et al. |
| 2010/0125842 A1 | 5/2010 | Friedman et al. |
| 2010/0128432 A1* | 5/2010 | Miller .................. G06F 1/20 361/679.54 |
| 2010/0138827 A1 | 6/2010 | Frank et al. |
| 2010/0153514 A1 | 6/2010 | Dabagh |
| 2010/0161908 A1 | 6/2010 | Nation et al. |
| 2010/0162039 A1 | 6/2010 | Goroff et al. |
| 2010/0174820 A1 | 7/2010 | Banga et al. |
| 2010/0199276 A1 | 8/2010 | Umbehocker |
| 2010/0228903 A1 | 9/2010 | Chandrasekaran |
| 2010/0235831 A1 | 9/2010 | Dittmer |
| 2010/0251238 A1 | 9/2010 | Schuba et al. |
| 2010/0262586 A1 | 10/2010 | Rosikiewicz et al. |
| 2010/0275198 A1 | 10/2010 | Jess et al. |
| 2010/0281166 A1 | 11/2010 | Buyya et al. |
| 2010/0299368 A1 | 11/2010 | Hutchins et al. |
| 2010/0299495 A1* | 11/2010 | Frank .................... G06F 9/5011 711/170 |
| 2010/0332889 A1 | 12/2010 | Shneorson et al. |
| 2011/0010515 A1 | 1/2011 | Ranade |
| 2011/0016096 A1 | 1/2011 | Teerlink |
| 2011/0061050 A1 | 3/2011 | Sahita et al. |
| 2011/0071983 A1 | 3/2011 | Murase |
| 2011/0075674 A1* | 3/2011 | Li .......................... H04L 45/04 370/401 |
| 2011/0099551 A1 | 4/2011 | Fahrig et al. |
| 2011/0145418 A1 | 6/2011 | Pratt |
| 2011/0145534 A1 | 6/2011 | Factor et al. |
| 2011/0145916 A1 | 6/2011 | McKenzie et al. |
| 2011/0154318 A1 | 6/2011 | Oshins et al. |
| 2011/0179413 A1 | 7/2011 | Subramanian |
| 2011/0184993 A1 | 7/2011 | Chawla et al. |
| 2011/0185292 A1 | 7/2011 | Chawala et al. |
| 2011/0202920 A1 | 8/2011 | Takase |
| 2011/0208909 A1 | 8/2011 | Kawaguchi |
| 2011/0239213 A1 | 9/2011 | Aswani et al. |
| 2011/0245724 A1 | 10/2011 | Flatland et al. |
| 2011/0258404 A1 | 10/2011 | Arakawa et al. |
| 2011/0314469 A1 | 12/2011 | Qian et al. |
| 2011/0320556 A1 | 12/2011 | Reuther |
| 2012/0002535 A1 | 1/2012 | Droux et al. |
| 2012/0005307 A1 | 1/2012 | Das et al. |
| 2012/0011505 A1 | 1/2012 | Fujisaki et al. |
| 2012/0030676 A1 | 2/2012 | Smith et al. |
| 2012/0036134 A1 | 2/2012 | Malakhov |
| 2012/0054746 A1 | 3/2012 | Vaghani |
| 2012/0066681 A1* | 3/2012 | Levy ..................... G06F 9/5027 718/1 |
| 2012/0079229 A1 | 3/2012 | Jensen et al. |
| 2012/0084445 A1 | 4/2012 | Brock et al. |
| 2012/0096211 A1* | 4/2012 | Davis .................... H04L 49/101 710/314 |
| 2012/0096461 A1 | 4/2012 | Goswami et al. |
| 2012/0102006 A1 | 4/2012 | Larson et al. |
| 2012/0102491 A1 | 4/2012 | Maharana |
| 2012/0117320 A1 | 5/2012 | Pinchover |
| 2012/0117555 A1 | 5/2012 | Banerjee |
| 2012/0124186 A1* | 5/2012 | Emerson .............. H04L 41/044 709/223 |
| 2012/0137098 A1 | 5/2012 | Wang et al. |
| 2012/0144229 A1* | 6/2012 | Nadolski ............. G06F 11/1484 714/4.2 |
| 2012/0158674 A1 | 6/2012 | Lillibridge |
| 2012/0167079 A1 | 6/2012 | Banerjee et al. |
| 2012/0167080 A1 | 6/2012 | Vilayannur |
| 2012/0167082 A1 | 6/2012 | Kumar et al. |
| 2012/0167085 A1 | 6/2012 | Subramaniyan et al. |
| 2012/0179874 A1 | 7/2012 | Chang et al. |
| 2012/0215970 A1 | 8/2012 | Shats |
| 2012/0221529 A1 | 8/2012 | Rosikiewicz et al. |
| 2012/0233668 A1 | 9/2012 | Leafe et al. |
| 2012/0254862 A1 | 10/2012 | Dong |
| 2012/0265959 A1 | 10/2012 | Le et al. |
| 2012/0266165 A1 | 10/2012 | Cen et al. |
| 2012/0272240 A1 | 10/2012 | Starks et al. |
| 2012/0284712 A1 | 11/2012 | Nimmagadda et al. |
| 2012/0291021 A1 | 11/2012 | Banerjee |
| 2012/0324040 A1* | 12/2012 | Velummylum ... G06F 17/30212 709/217 |
| 2013/0007219 A1 | 1/2013 | Sorenson et al. |
| 2013/0013865 A1* | 1/2013 | Venkatesh ............. G06F 12/128 711/133 |
| 2013/0014103 A1 | 1/2013 | Reuther et al. |
| 2013/0055259 A1 | 2/2013 | Dong |
| 2013/0061014 A1 | 3/2013 | Prahlad et al. |
| 2013/0139153 A1 | 5/2013 | Shah |

(56) References Cited

U.S. PATENT DOCUMENTS

| | | | | |
|---|---|---|---|---|
| 2013/0326053 | A1* | 12/2013 | Bauer | G06F 11/20 709/224 |
| 2014/0006731 | A1 | 1/2014 | Uluski et al. | |
| 2014/0007189 | A1* | 1/2014 | Huynh | G06F 3/0622 726/3 |

OTHER PUBLICATIONS

Non-final Office Action dated Dec. 26, 2012 for U.S. Appl. No. 13/207,365.

Non-final Office Action dated Jan. 24, 2013 for U.S. Appl. No. 13/207,371.

Thekkath et al., "Frangipani: A Scalable Distributed File System", SOSP, 1997, 24 pages.

Mendel Rosenblum, "The Design and Implementation of a Log-structured File System", SOSP, 1991, 101 pages.

Birrell et al., "A Simple and Efficient Implementation for Small Databases", Aug. 11, 1987, 17 pages.

Terry et al., "Managing Update Conflicts in Bayou, a Weakly Connected Replicated Storage System", Association for Computing Machinery, 1995, 12 pages.

Mike Burrows, "The Chubby lock service for loosely-coupled distributed systems", OSDI 2006 Paper, Google Inc., Sep. 6, 2006, 23 pages.

Lee et al., "Petal: Distributed Virtual Disks" The Proceedings of the 7th International Conference on Architectural Support for Programming Languages and Operating Systems, 1996, 9 pages.

Dean et al., "MapReduce: Simplified Data Processing on Large Clusters", OSDI 2004, 6th Symposium on Operating Systems Design and Implementation, Google Inc, Oct. 3, 2004, 25 pages.

Chang et al., "Bigtable: A Distributed Storage System for Structured Data" OSDI 2006 Paper, 7th USENIX Symposium on Operating Systems Design and Implementation, 2006, 20 pages.

Ghemawat et al., "The Google File System", SOSP 2003, ACM, Bolton Landing, NY, 2003, 15 pages.

Zhu et al., "Avoiding the Disk Bottleneck in the Data Domain Deduplication File System", Data Domain, Inc., 2008, 15 pages.

DeCandia et al., "Dynamo: Amazon's Highly Available Key-value Store", Proceedings of the 21st ACM Symposium on Operating Systems Principles, Oct. 2007, 16 pages.

"Project Voldemort, A distributed database, Jan. 9, 2013 url: http://www.project-voldemort.com/voldemort/".

Bernstein et al., "Concurrency Control and Recovery in Database Systems", Addison-Wesley 1987, 35 pages.

Weikum et al., "Transactional Information Systems: Theory, Algorithms, and the Practice of Concurrency Control and Recovery", 2002, 91 pages.

Timothy L. Harris, "A Pragmatic Implementation of Non-Blocking Linked-Lists", 2001, 15 pages.

Lakshman et al., "Cassandra—A Decentralized Structured Storage System", LADIS, 2009, 6 pages.

"Open iSCSI", Project: Open-iSCSI—RFC3720 architecture and implementation, 2005 url: http://www.open-iscsi.org.

"Chunkfs", Aug. 22, 2009 url: http://valerieaurora.org/chunkfs/.

"Hypertable", Hypertable Inc., Oct. 28, 2012 url: http://hypertable.org/.

MacCormick et al., "Boxwood: Abstractions as the Foundation for Storage Infrastructure" OSDI 2004, Microsoft Research Silicon Valley, 31 pages.

Robert Hagmann, "Reimplementing the Cedar File System Using Logging and Group Commit", ACM, 1987, 8 pages.

Sherman et al., "ACMS: The Akamai Configuration Management System" NSDI, 2005, 22 pages.

Petersen et al., "Flexible Update Propagation for Weakly Consistent Replication", SOSP, 1997, 19 pages.

Banga et al., "Resource containers: A new facility for resource management in server systems" Proceedings of the 3rd USENIX Symposium on ODSI, 1999, 15 pages.

F. Mattern, "Virtual Time and Global States of Distributed Systems" Proceedings of the International Workshop on Parallel and Distributed Algorithms, 1989, 15 pages.

Maged M. Michael, "High Performance Dynamic Lock-Free Hash Tables and List-Based Sets" SPAA 2002, Aug. 2002, 10 pages.

Welsh et al., "SEDA: An Architecuture for Well-Conditioned, Scalable Internet Services" Proceedings of the Eighteenth Symposium on Operating Systems Principles, Oct. 2001, 15 pages.

Notice of Allowance and Fees Due dated Apr. 8, 2013 for U.S. Appl. No. 13/207,365 (Nutanix-003).

Non-final Office Action dated Apr. 11, 2013 for U.S. Appl. No. 13/207,345 (Nutanix-001).

Final Office Action dated Jun. 27, 2013 for U.S. Appl. No. 13/207,371 (Nutanix-004).

Notice of Allowance and Fees Due dated Aug. 23, 2013 for U.S. Appl. No. 13/207,345.

Non-final Office Action dated Jan. 27, 2014 for U.S. Appl. No. 13/571,188.

Non-final Office Action dated Apr. 24, 2014, for U.S. Appl. No. 13/744,655.

Notice of Allowance and Fees Due dated May 23, 2014 for U.S. Appl. No. 13/207,357.

Non-Final Office Action dated May 16, 2014 for U.S. Appl. No. 13/744,649.

Notice of Allowance dated Jun. 11, 2014 for U.S. Appl. No. 13/571,188.

Non-final Office Action dated Aug. 26, 2014 for U.S. Appl. No. 13/744,668.

Corrected Notice of Allowance dated Sep. 5, 2014 for U.S. Appl. No. 13/207,357.

Non-final Office Action dated Sep. 26, 2014 for U.S. Appl. No. 13/947,668.

Non-final Office Action dated Oct. 2, 2014 for U.S. Appl. No. 13/564,511.

Non-final Office Action dated Oct. 16, 2014 for U.S. Appl. No. 13/744,683.

Final Office Action dated Nov. 3, 2014, for U.S. Appl. No. 13/744,649.

Final Office Action dated Nov. 3, 2014, for U.S. Appl. No. 13/744,655.

Non-final Office Action dated Nov. 6, 2014, for U.S. Appl. No. 13/744,693.

Notice of Allowance and Fees Due dated Nov. 21, 2014, for U.S. Appl. No. 13/744,703.

Notice of Allowance and fees Due dated Dec. 1, 2014 for U.S. Appl. No. 13/207,371.

Final Office Action dated Jan. 30, 2015 for U.S. Appl. No. 13/564,511.

Notice of Allowance and Fee(s) Due dated Feb. 6, 2015 for U.S. Appl. No. 13/744,683.

Final Office Action dated Feb. 12, 2015 for U.S. Appl. No. 13/744,668.

Non-final Office Action dated Feb. 23, 2015 for U.S. Appl. No. 13/744,649.

Non-final Office Action dated Feb. 24, 2015 for U.S. Appl. No. 13/830,116.

Non-final Office Action dated Mar. 5, 2015 for U.S. Appl. No. 13/744,655.

Non-final Office Action dated Mar. 11, 2015 for U.S. Appl. No. 13/551,291.

Non-final Office Action dated Mar. 12, 2015 for U.S. Appl. No. 14/514,326.

Final Office Action dated Apr. 9, 2015 for U.S. Appl. No. 13/744,693.

Notice of Allowance and Fee(s) Due dated Apr. 22, 2015 for U.S. Appl. No. 14/500,730.

Non-final Office Action dated Apr. 27, 2015 for U.S. Appl. No. 14/500,752.

Final Office Action dated May 5, 2015 for U.S. Appl. No. 13/947,668.

Non-final Office Action dated May 6, 2015 for U.S. Appl. No. 13/564,511.

Non-final Office Action dated Jun. 1, 2015 for U.S. Appl. No. 13/744,668.

Final Office Action dated Jun. 5, 2015 for U.S. Appl. No. 13/744,649.

Final Office Action dated Aug. 14, 2015 for related U.S. Appl. No. 13/830,116.

Non-final Office Action dated Aug. 25, 2015 for related U.S. Appl. No. 13/744,693.

(56) References Cited

OTHER PUBLICATIONS

Final Office Action dated Aug. 26, 2015 for related U.S. Appl. No. 13/744,655.
Notice of Allowance and Fee(s) due dated Sep. 15, 2015 for related U.S. Appl. No. 14/500,730.
Non-final Office Action dated Sep. 17, 2015, for related U.S. Appl. No. 13/744,649.
Notice of Allowance and fees due dated Sep. 30, 2015, for related U.S. Appl. No. 14/514,326.
Final Office Action dated Oct. 1, 2015 for related U.S. Appl. No. 13/551,291.
Notice of Allowance and Fees due dated Oct. 2, 2015 for related U.S. Appl. No. 13/744,668.
Final Office Action dated Nov. 20, 2015 for related U.S. Appl. No. 13/564,511.
Non-final Office Action dated Dec. 31, 2015 for related U.S. Appl. No. 13/830,116.
Nigmandjanovich et al., "Policy-based dynamic resource allocation for virtual machines on Xen-enabled virtualization environment", IEEE, 2010, pp. 353-355.
Bolte et al., "Non-intrusive Virtualization Management using Libvert", EDAA 2010, pp. 574-577.
Final Office Action dated Jan. 6, 2016 for related U.S. Appl. No. 14/500,752.
Corrected Notice of Allowance dated Jan. 11, 2016 for U.S. Appl. No. 14/500,730.
Notice of Allowability dated Jan. 20, 2016 for related U.S. Appl. No. 13/947,668.
Non-final Office Action dated Jan. 25, 2016 for related U.S. Appl. No. 13/744,655.
Non-final Office Action dated Feb. 12, 2016 for related U.S. Appl. No. 13/551,291.
Notice of Allowance and Fee(s) Due dated Mar. 8, 2016 for related U.S. Appl. No. 13/744,649.
Non-final Office Action dated Mar. 10, 2016 for related U.S. Appl. No. 13/564,511.
Final Office Action dated Mar. 28, 2016 for related U.S. Appl. No. 13/744,693.
Notice of Allowance and Fee(s) due dated Jun. 14, 2016 for related U.S. Appl. No. 13/744,655.
Final Office Action dated Jul. 29, 2016 for related U.S. Appl. No. 13/830,116.
Final Office Action dated Aug. 12, 2016 for related U.S. Appl. No. 13/551,291.
Notice of Allowance and Fee(s) due dated Sep. 6, 2016 for related U.S. Appl. No. 13/744,693.
Notice of Allowance and Fee(s) due dated Sep. 26, 2016 for related U.S. Appl. No. 13/744,655.
Final Office Action dated Oct. 25, 2016 for related U.S. Appl. No. 13/564,511.
Non-final Office Action dated Dec. 13, 2016 for related U.S. Appl. No. 13/551,291.
Notice of Allowance and Fees Due dated Jan. 6, 2017 for related U.S. Appl. No. 13/830,116.
Notice of Allowance and Fees Due dated Apr. 5, 2017 for related U.S. Appl. No. 13/564,511.
Notice of Allowance and Fees Due dated May 24, 2017 for related U.S. Appl. No. 13/551,291.
Non-Final Office Action dated Oct. 24, 2017 for related U.S. Appl. No. 14/684,901 [Nutanix-004-C1], 13 pages.
Final Office Action dated May 14, 2018 for related U.S. Appl. No. 14/684,901 [Nutanix-004-C1], 11 pages.
Non-Final Office Action dated Sep. 20, 2018 for related U.S. Appl. No. 14/684,901, 12 pages.

Non-Final Office Action dated Nov. 15, 2018 for related U.S. Appl. No. 15/714,880, 13 pages.
Non-Final Office Action dated Aug. 16, 2018 for related U.S. Appl. No. 15/436,196, 12 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Notice of Allowance dated Apr. 24, 2019 for related U.S. Appl. No. 14/684,901, 9 pages.
Oracle, "Maximize Value from IT Assets: No-Cost Virtualization and Consolidation from Oracle", (Mar. 13, 2011) date captured by Archive.org, from http://www.oracle.com/us/products/servers-storage/servers/x86/consolidation-virtualization-brief-301206.pdf.
Okano, "Future Trends of BladeServer: Virtualization and Optimization", (Apr. 30, 2004), *NEC Journal of Advanced Technology*, vol. 1, No. 2.
Cisco, "A Platform Built for Server Virtualization: Cisco Unified Computing System", (Dec. 2009).
Hess, K., "7 Blade Server Solutions to Transform Your Data Center", (Dec. 12, 2011), SeverWatch, from https://www.serverwatch.com/server-trends/7-blade-server-solutions-to-transform-your-data-center.html.
Godsey, L., "Blade Servers vs. Rack Servers", (Oct. 31, 2009) date identified by Google, Techwalla, from https://www.techwalla.com/articles/blade-servers-vs-rack-servers.
Parent, K., "Server Consolidation in a Validated Environment", (Aug. 4, 2005), White Paper, Pharma Manufacturing.
Cisco, "Newer Cisco SBA Guides Available", (Feb. 2011), Cisco Systems, Inc., from http://icon.zhiding.cn/cisco/solution/iba_dc_ucs-c_vmware_deployment_guide.pdf.
Hess, K., "Blades vs. standard racked servers for virtualization", (May 23, 2012), ZDNet, from https://www.zdnet.com/article/blades-vs-standard-racked-servers-for-virtualization/.
VMware, "VMware Infrastructure Architecture Overview", White Paper, (Jun. 14, 2006) date captured by Archive.org.

\* cited by examiner

500

ARCHITECTURE FOR IMPLEMENTING A VIRTUALIZATION ENVIRONMENT AND APPLIANCE

CROSS REFERENCE TO RELATED APPLICATIONS

The present application is a continuation application of U.S. patent application Ser. No. 13/551,291, filed on Jul. 17, 2012, issued as U.S. Pat. No. 9,772,866 on Sep. 26, 2017, which is hereby incorporated by reference in its entirety.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows multiple virtual machines to run on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Many organizations use data centers to implement virtualization, where the data centers are typically architected with traditional servers that communicate with a set of networked storage devices over a network. For example, many data centers are designed using diskless computers ("application servers") that communicate with a set of networked storage appliances ("storage servers") via a network, such as a Fiber Channel or Ethernet network.

The problem is that this traditional approach cannot adapt to the modern demands of virtualization, which is particularly problematic with respect to the way these traditional architectures manage storage. One reason for this is because the traditional network storage-based architecture is designed for physical servers that serve relatively static workloads, but which is not flexible or adaptable enough to adequately handle the dynamic nature of storage and virtual machines that, in a virtualization or cloud computing environment, may be created or moved on the fly from one network location to another.

Moreover, the traditional approach relies upon very large and specialized rackmount or freestanding compute and storage devices that are managed by a central storage manager. This approach does not scale very well, since the central storage manager becomes a very significant performance bottleneck as the number of storage devices increase. Moreover, the traditional compute and storage devices are expensive to purchase, maintain, and power, and are large enough to require a significant investment just in terms of the amount of physical space that is needed to implement the data center.

Given these challenges with the traditional data center architectures, it has become clear that the conventional approaches to implement a data center for virtualization presents excessive levels of cost and complexity, while being very ill-adapted to the needs of modern virtualization systems. These problems are further exacerbated by the fact that data volumes are constantly growing at a rapid pace in the modern data center, thanks to the ease of creating new VMs. In the enterprise, new initiatives like desktop virtualization contribute to this trend of increased data volumes. This growing pool of VMs is exerting tremendous cost, performance and manageability pressure on the traditional architecture that connects compute to storage over a multi-hop network.

Therefore, there is a need for an improved approach to implement an architecture for a virtualization data center.

SUMMARY

Embodiments of the present invention provide an improved architecture which enables significant convergence of the components of a system to implement virtualization. The infrastructure is VM-aware, and permits SOCS provisioning to allow storage on a per-VM basis, while identifying I/O coming from each VM. The current approach can scale out from a few nodes to a large number of nodes. In addition, the inventive approach has ground-up integration with all types of storage, including solid-state drives. The architecture of the invention provides high availability against any type of failure, including disk or node failures. In addition, the invention provides high performance by making I/O access local, leveraging solid-state drives and employing a series of patent-pending performance optimizations.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Embodiments of the present invention provide an improved approach to implement virtualization appliances for a datacenter which address and correct the problems of the prior art. According to some embodiments, the present invention provides a scalable compute and storage infrastructure that effectively and efficiently allows organizations to virtualize their data centers. The virtualization appliance of the present invention provides complete compute and storage capabilities along with performance, scalability, availability and data management features. In some embodiments, the virtualization appliances leverages industry-standard hardware components and advanced storage management software to provide an out-of-the-box solution that makes virtualization extremely easy and cost effective.

Figure 1:
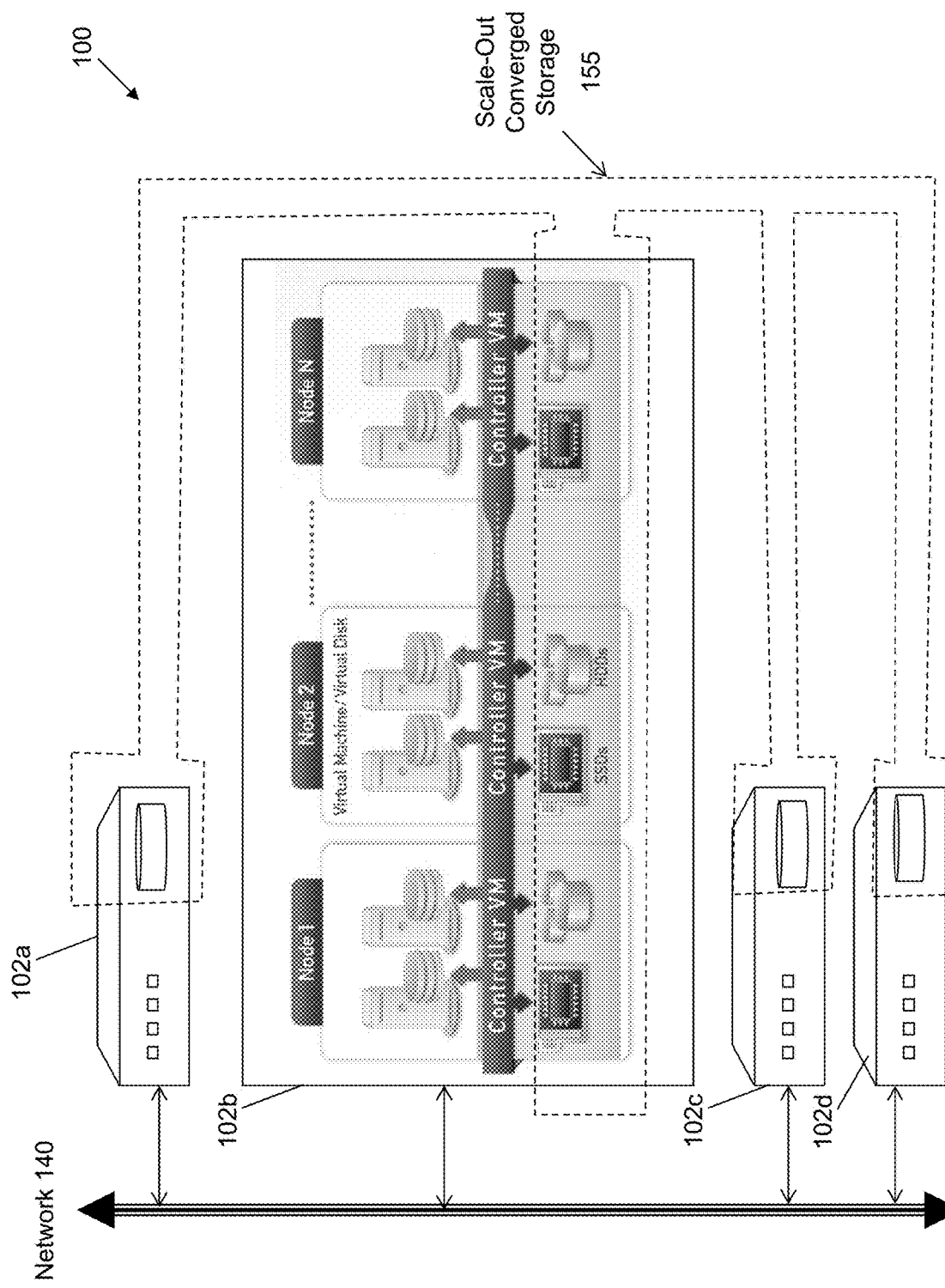
FIG. 1 illustrates an example architecture to implement virtualization according to some embodiments of the invention.

FIG. 1 shows an integrated collection (or "cluster") 100 of virtualization appliances or "blocks" 102a, 102b, 102c, and 102d. Each of the blocks includes hardware and software to implement a virtualization solution. For example, block 102b is internally organized to include hardware and software to implement multiple virtualization nodes. Each node runs a standard hypervisor on hardware that contains processors, memory and local storage, such as a mix of SSDs and/or hard disk drives. Each node runs virtual machines just like a standard virtual machine host.

In addition, local storage from all nodes is virtualized into a unified storage pool, which is referred to herein as "scale-out converged storage" or "SOCS" 155. As described in more detail below, SOCS 155 acts like an advanced SAN that uses local SSDs and disks from all nodes to store virtual machine data. Virtual machines running on the cluster write data to SOCS as if they were writing to a SAN. SOCS is VM-aware and provides advanced data management features. This approach brings the data closer to virtual machines by storing the data locally on the system (if desired), resulting in higher performance at a lower cost. As discussed in more detail below, this solution can horizontally scale from a few nodes to a large number of nodes, enabling organizations to scale their infrastructure as their needs grow.

While traditional SAN solutions typically have 1, 2, 4 or 8 controllers, an n-node system according to the present embodiment has n controllers. Every node in the cluster runs a special virtual machine, called a Controller VM (or "service VM"), which acts as a virtual controller for SOCS. All Controller VMs in the cluster communicate with each other to form a single distributed system. Unlike traditional SAN/NAS solutions that are limited to a small number of fixed controllers, this architecture continues to scale as more nodes are added.

Figure 2:
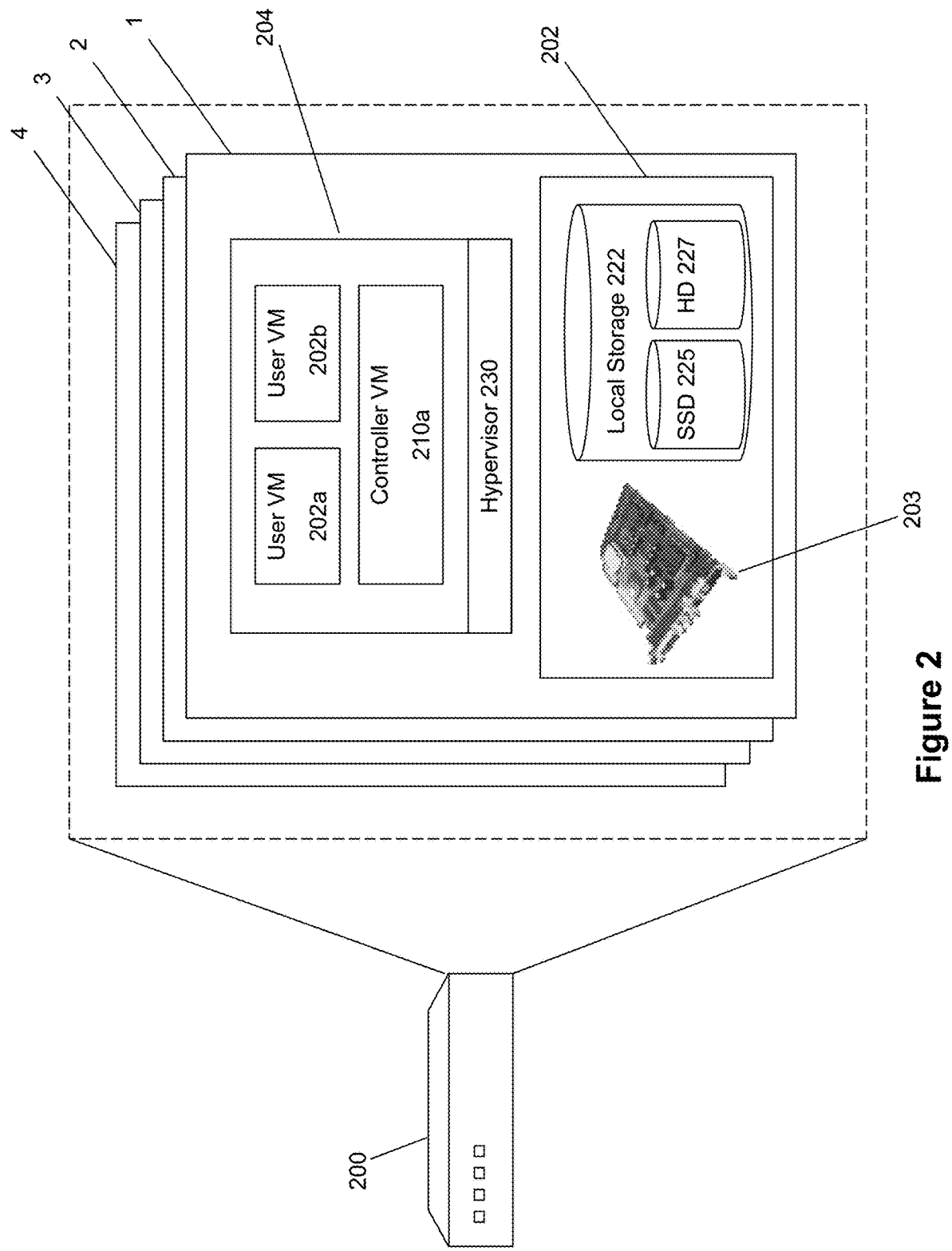
FIG. 2 illustrates an example block to implement virtualization according to some embodiments of the invention.

As stated above, each block includes a sufficient collection of hardware and software to provide a self-contained virtualization appliance, e.g., as shown in FIG. 2. The example block 200 in FIG. 2 includes four nodes 1-4. Having the multiple nodes within a block allows both high performance and reliability. Performance is increased since there are multiple independent nodes to handle the virtualization needs of the system. Reliability is improved since the multiple nodes provide for redundancy in the event of a possible hardware or software error. Moreover, as discussed below, the software-based storage management solution allow for easy movement of data as the storage needs of the system changes.

Each node in the block includes both hardware components 202 and software components 204 to implement virtualization. Hardware components 202 includes processing capacity (e.g., using one or more processors) and memory capacity (e.g., random access memory or RAM) on a motherboard 203. The node also comprises local storage 222, which in some embodiments include Solid State Drives (henceforth "SSDs") 125 and/or Hard Disk Drives (henceforth "HDDs" or "spindle drives") 127. Any combination of SSDs and HDDs may be used to implement the local storage 222.

The software 204 includes a hypervisor 230 to manage the interactions between the underlying hardware 202 and the one or more user VMs 202a and 202b that run client software. A controller VM 210a exists on each node to implement distributed storage management of the local storage 222, such that the collected local storage for all nodes can be managed as a combined SOCS.

Figure 3:
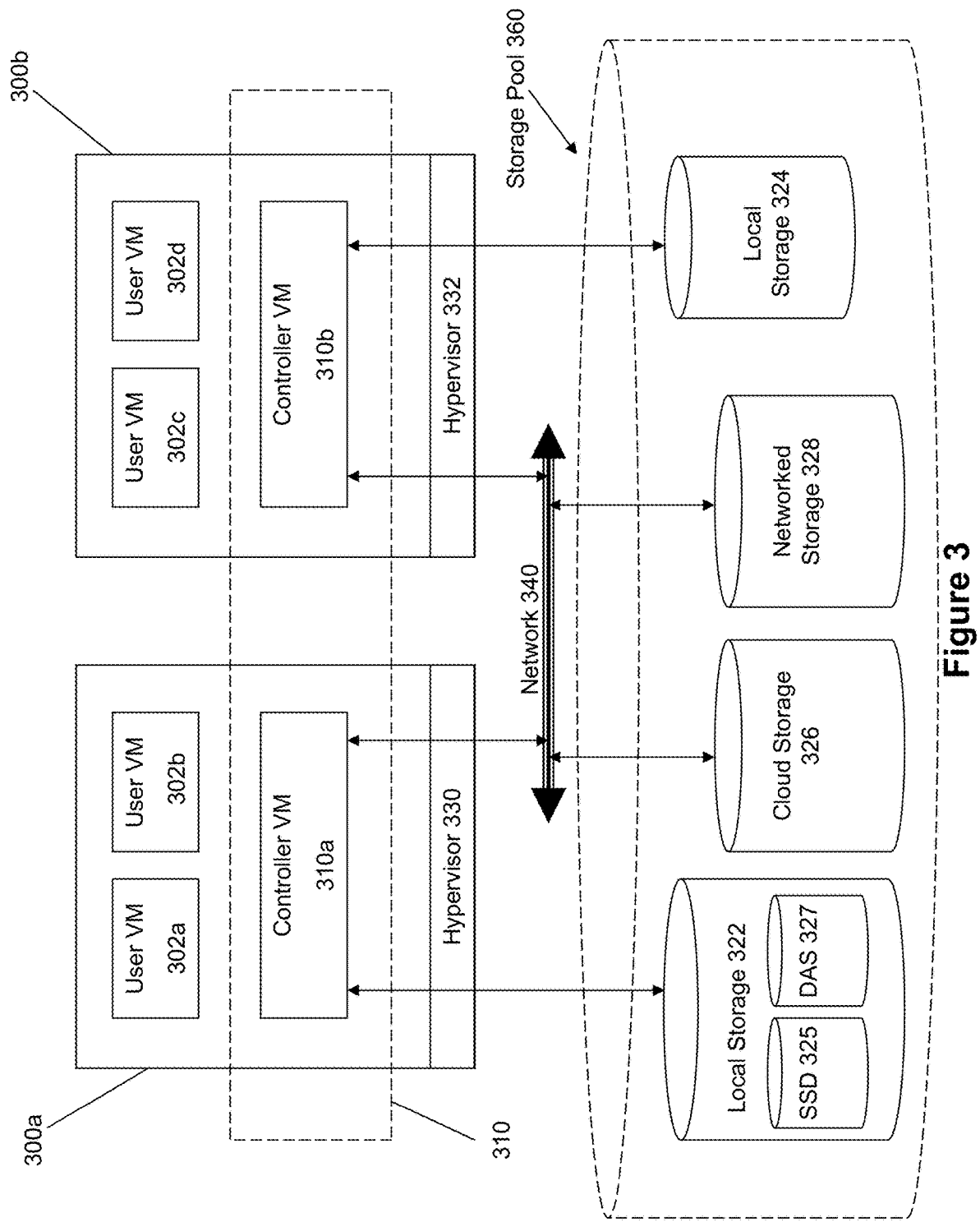
FIG. 3 illustrates an example architecture to implement I/O and storage device management in a virtualization environment according to some embodiments of the invention.

FIG. 3 illustrates an approach for implementing SOCS-based storage management in a virtualization environment according to some embodiments of the invention. The architecture of FIG. 3 can be implemented for a distributed platform that contains multiple nodes/servers 300a and 300b that manages multiple-tiers of storage. The nodes 300a and 300b may be within the same block, or on different blocks in a clustered environment of multiple blocks. The multiple tiers of storage include storage that is accessible through a network 340, such as cloud storage 326 or networked storage 328 (e.g., a SAN or "storage area network"). In addition, the present embodiment also permits local storage 322/324 that is within or directly attached to the server and/or appliance to be managed as part of the storage pool 360. As noted above, examples of such storage include any combination of SSDs 325 and/or HDDs 327. These collected storage devices, both local and networked, form a storage pool 360.

Virtual disks (or "vDisks") can be structured from the storage devices in the storage pool 360, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM. Each server 300a or 300b runs virtualization software, such as VMware ESX(i), Microsoft Hyper-V, or RedHat KVM. The virtualization software includes a hypervisor 330/332 to manage the interactions between the underlying hardware and the one or more user VMs 302a, 302b, 302c, and 302d that run client software.

Controller VM 310a/310b (also referred to herein as "service VMs") are used to manage storage and I/O activities. This is the distributed "Storage Controller" in the currently described architecture. Multiple such storage controllers coordinate within a cluster to form a single-system. The Controller VMs 310a/310b are not formed as part of specific implementations of hypervisors 330/332. Instead, the Controller VMs run as virtual machines above hypervisors 330/332 on the various nodes/servers 302a and 302b, and work together to form a distributed system 310 that manages all the storage resources, including the locally attached storage 322/324, the networked storage 328, and the cloud storage 326. Since the Controller VMs run above the hypervisors 330/332, this means that the current approach can be used and implemented within any virtual machine architecture, since the Controller VMs of embodiments of the invention can be used in conjunction with any hypervisor from any virtualization vendor.

Each Controller VM 310a-b exports one or more block devices or NFS server targets that appear as disks to the client VMs 302a-d. These disks are virtual, since they are implemented by the software running inside the Controller VMs 310a-b. Thus, to the user VMs 302a-d, the Controller VMs 310a-b appear to be exporting a clustered storage appliance that contains some disks. All user data (including the operating system) in the client VMs 302a-d resides on these virtual disks.

Significant performance advantages can be gained by allowing the virtualization system to access and utilize local (e.g., server-internal) storage 322 as disclosed herein. This is because I/O performance is typically much faster when performing access to local storage 322 as compared to performing access to networked storage 328 across a network 340. This faster performance for locally attached storage 322 can be increased even further by using certain types of optimized local storage devices, such as SSDs 325. Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 322. On the other hand, data that does not require fast access or which is accessed infrequently can be stored in the networked storage devices 328 or in cloud storage 326. In addition, the performance of the local storage can be further improved by changing the mix of SSDs and HDDs within the local storage, e.g., by increasing or decreasing the proportion of SSDs to HDDs in the local storage.

The present architecture solves storage challenges for virtual machines providing a general-purpose scale-out compute and storage infrastructure that eliminates the need for network storage. In part, this is due to the distributed nature of the storage controller infrastructure that utilizes controller VMs to act as a virtual controller for SOCS. Since all the Controller VMs in the cluster communicate with each other to form a single distributed system, this eliminates the limitations and performance bottlenecks associated with traditional SAN solutions that typically have only 1, 2, 4 or 8 controllers. Therefore, n-node clusters will essentially have n controllers, providing a solution that will easily scale to very large data volumes.

In addition, the solution will very effectively support virtualization and hypervisor functions, within a single virtualization appliance (block) that can be extensively combined with other blocks to support large scale virtualization needs. Since the architecture is VM-aware, it overcomes limitations of traditional solutions that were optimized to work only with physical servers. For example, the present approach overcomes limitations associated with the traditional unit of management for storage pertaining to LUNs, where if a LUN is shared by many VMs, it becomes more difficult to perform storage operations such as backup, recovery, and snapshots on a per-VM basis. It is also difficult to identify performance bottlenecks in a heavily-shared environment due to the chasm between computing and storage tiers. The current architecture overcomes these limitations since the storage units (vdisks) are managed across an entire virtual storage space.

Moreover, the present approach can effectively take advantage of enterprise-grade solid-state drives (SSDs). Traditional storage systems were designed for spinning media and it is therefore difficult for these traditional systems to leverage SSDs efficiently due to the entirely different access patterns that SSDs provide. While hard disks have to deal with the rotation and seek latencies, SSDs do not have such mechanical limitations. This difference between the two media requires the software to be optimized differently for performance. One cannot simply take software written for hard disk-based systems and hope to use it efficiently on solid-state drives. The present architecture can use any type of storage media, including SSDs, and can use SSDs to store a variety of frequently-accessed data, from VM metadata to primary data storage, both in a distributed cache for high-performance and in persistent storage for quick retrieval.

In some embodiment, to maximize the performance benefits of using SSDs, the present architecture reserves SSDs for I/O-intensive functions and includes space-saving techniques that allow large amounts of logical data to be stored in a small physical space. In addition, the present approach can be used to migrate "cold" or infrequently-used data to hard disk drives automatically, allowing administrators to bypass SSDs for low-priority VMs.

The present architecture therefore provides a solution that enables significant convergence of the storage components of the system with the compute components, allowing VMs and SOCS to co-exist within the same cluster. From a hardware perspective, each block provides a "building block" to implement an expandable unit of virtualization, which is both self-contained and expandable to provide a solution for any sized requirements.

Figure 4A:
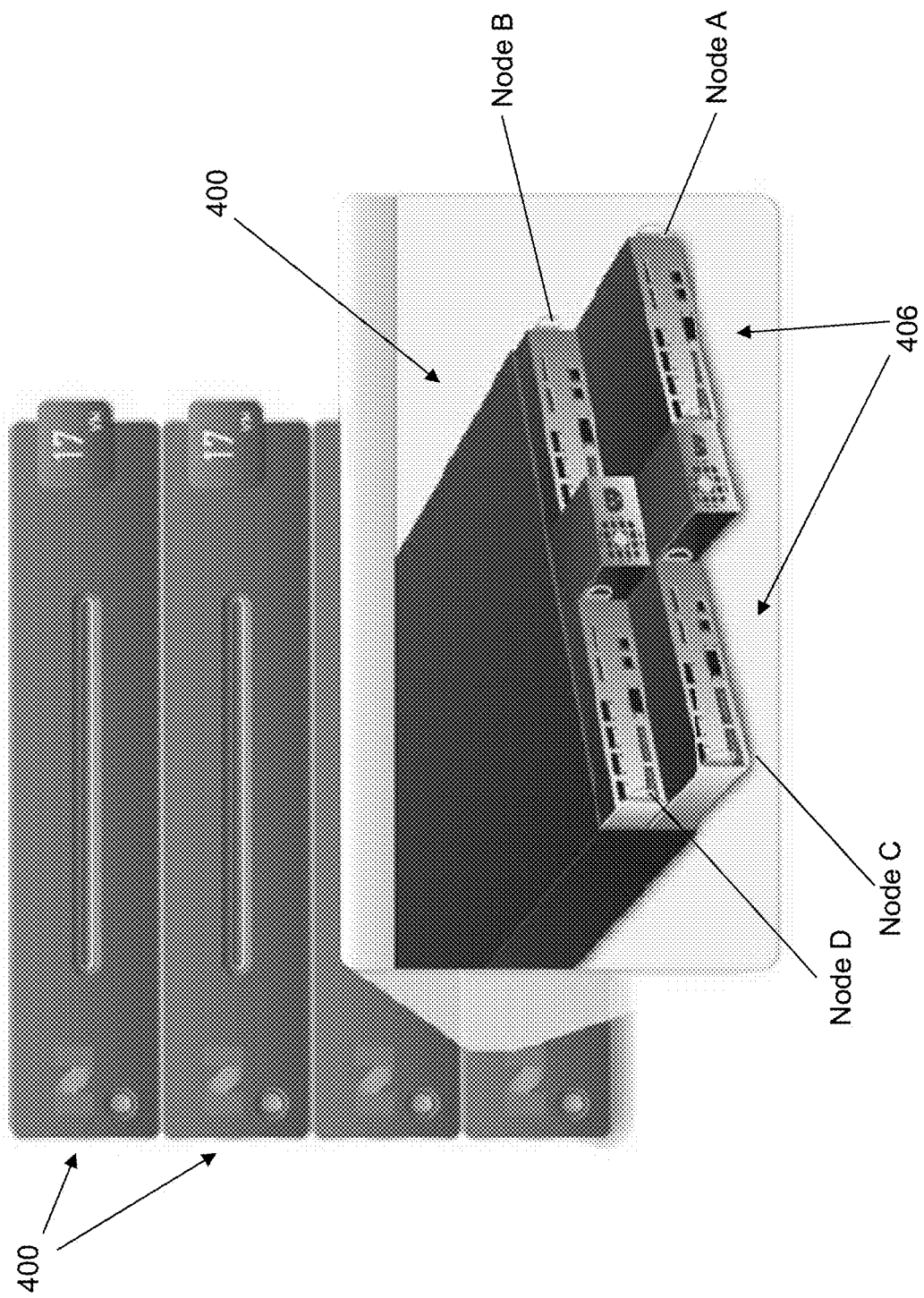
FIGS. 4A-D illustrate example designs for a block according to some embodiments of the invention.
Figure 4B:
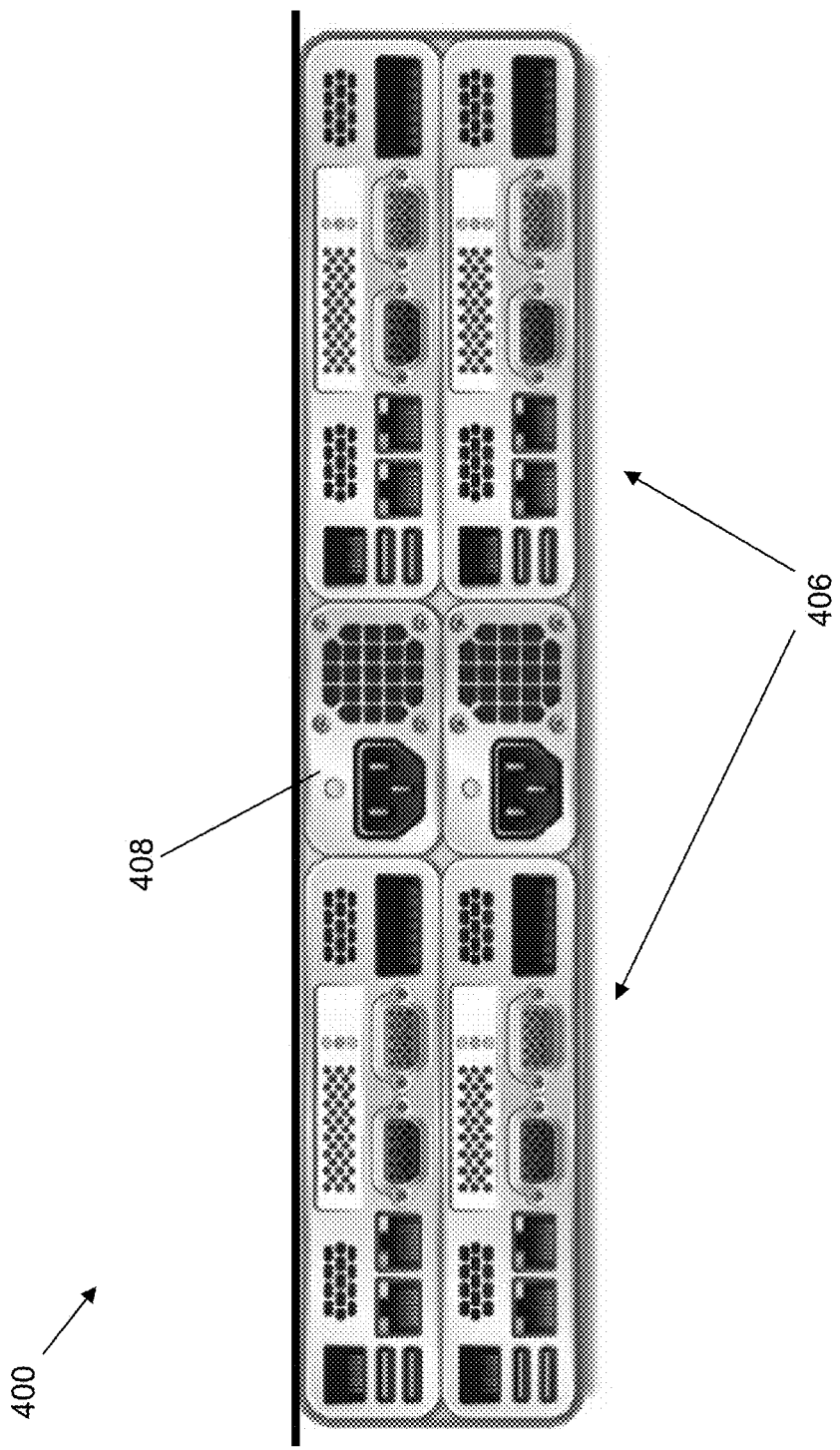
Figure 4C:
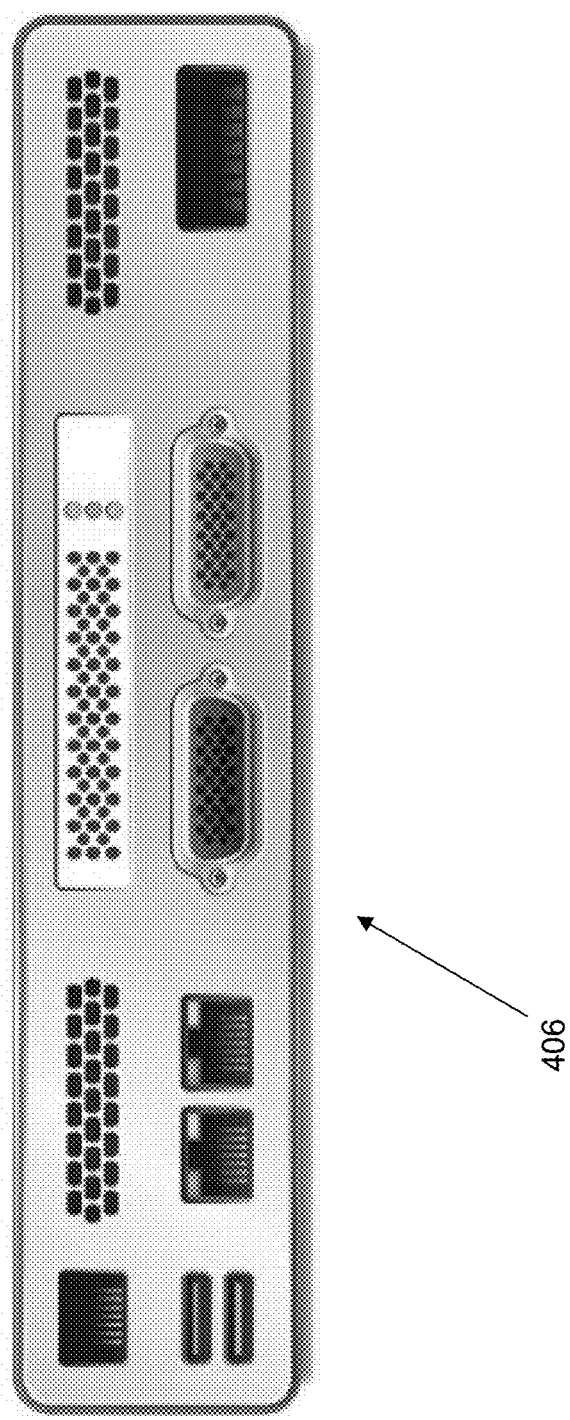

FIGS. 4A-D illustrate a block 400 according to some embodiments of the invention. As shown in FIG. 4A, each block 400 can be mounted on a rack with other blocks, and can be instantiated in a chassis that hold multiple nodes A, B, C, and D. Each node corresponds to a serverboard 406 that is insertable into the chassis and which contains one or more processors, memory components, and other hardware components typically found on a motherboard. FIG. 4A shows a perspective view of the block 400, showing the serverboards of the nodes in a partially inserted position. FIG. 4B shows an end view of the block 400, illustrating the arrangement of the nodes/serverboards 406 in a fully inserted position within the chassis. FIG. 4C illustrates an end view of a single serverboard 406, showing the various connection points for wiring and peripherals for the serverboard, e.g., network connectors.

Each of the serverboards 406 acts as a separate node within the block 400. As independent nodes, each node may be powered on or off separately without affecting the others. In addition, the serverboards 406 are hot swappable and may be removed from the end of the chassis without affecting the operation of the other serverboards. This configuration of multiple nodes ensures hardware-based redundancy of processing and storage capacity for the block, with the storage management software providing for operational redundancies of the data stored and managed by the block.

The block 400 also includes multiple power supply modules 408, e.g., two separate modules as shown in FIG. 4B. This provides for power redundancy, so that failure of a single power supply module will not bring down the whole block 400.

The block 400 supports multiple local storage devices. In some embodiments, the block 400 includes a backplane that allows connection of six SAS or SATA storage units to each node, for a total of 24 storage units 404 for the block 400. Any suitable type or configuration of storage unit may be connected to the backplane, such as SSDs or HDDs. In some embodiments, any combination of SSDs and HDDs can be implemented to form the six storage units for each node, including all SSDs, all HDDs, or a mixture of SSDs and HDDs.

Figure 4D:
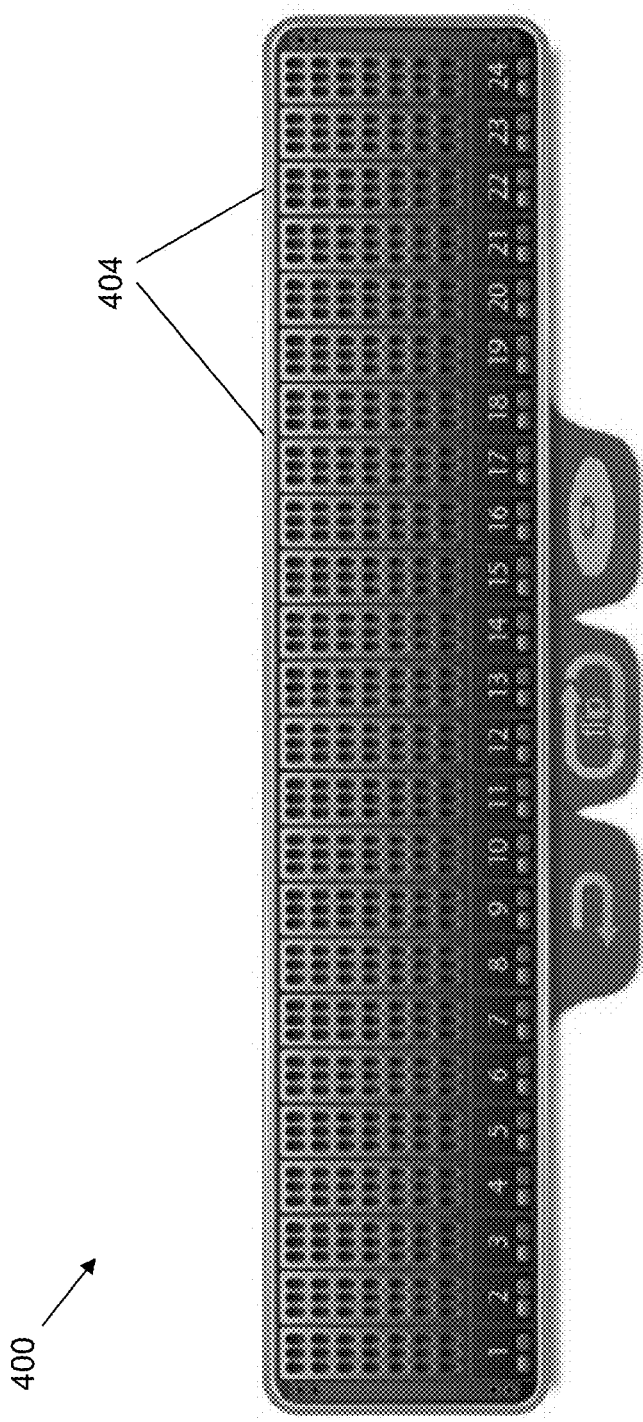

FIG. 4D shows an end view of the portion of the block/chassis corresponding to the storage units. Each of the individual storage units 404 are insertable into the chassis of block 400. In addition, the storage units are hot swappable and may be removed from the end of the chassis without affecting the operation of the other storage units. This configuration of multiple storage units ensures hardware-based redundancy of the storage capacity for the block.

The entirety of the block 400 fits within a "2u" or less form factor unit. A rack unit or "u" (also referred to as a "RU") is a unit of measure used to describe the height of equipment intended for mounting in a rack system. In some embodiments, one rack unit is 1.75 inches (44.45 mm) high. This means that the 2u or less block provides a very space-efficient and power-efficient building block for implementing a virtualized data center. The redundancies that are built into the block mean that there is no single point of failure that exists for the unit. The redundancies also mean that there is no single point of bottleneck for the performance of the unit.

Figure 5:
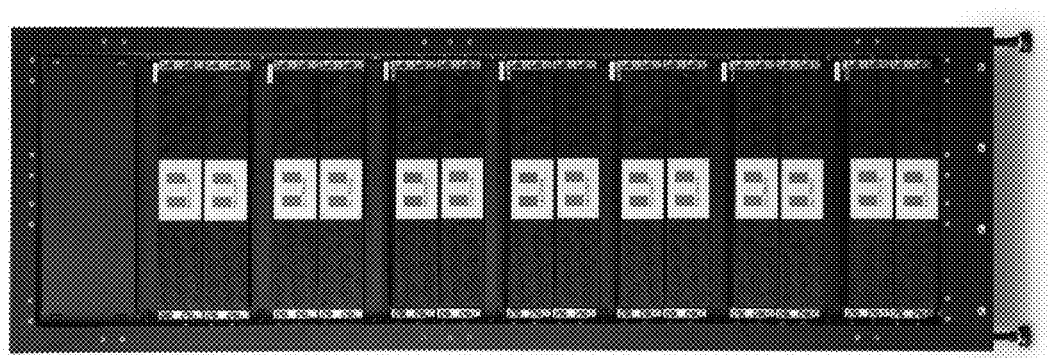
FIG. 5 illustrates a rack of blocks according to some embodiments of the invention.
Figure 6:
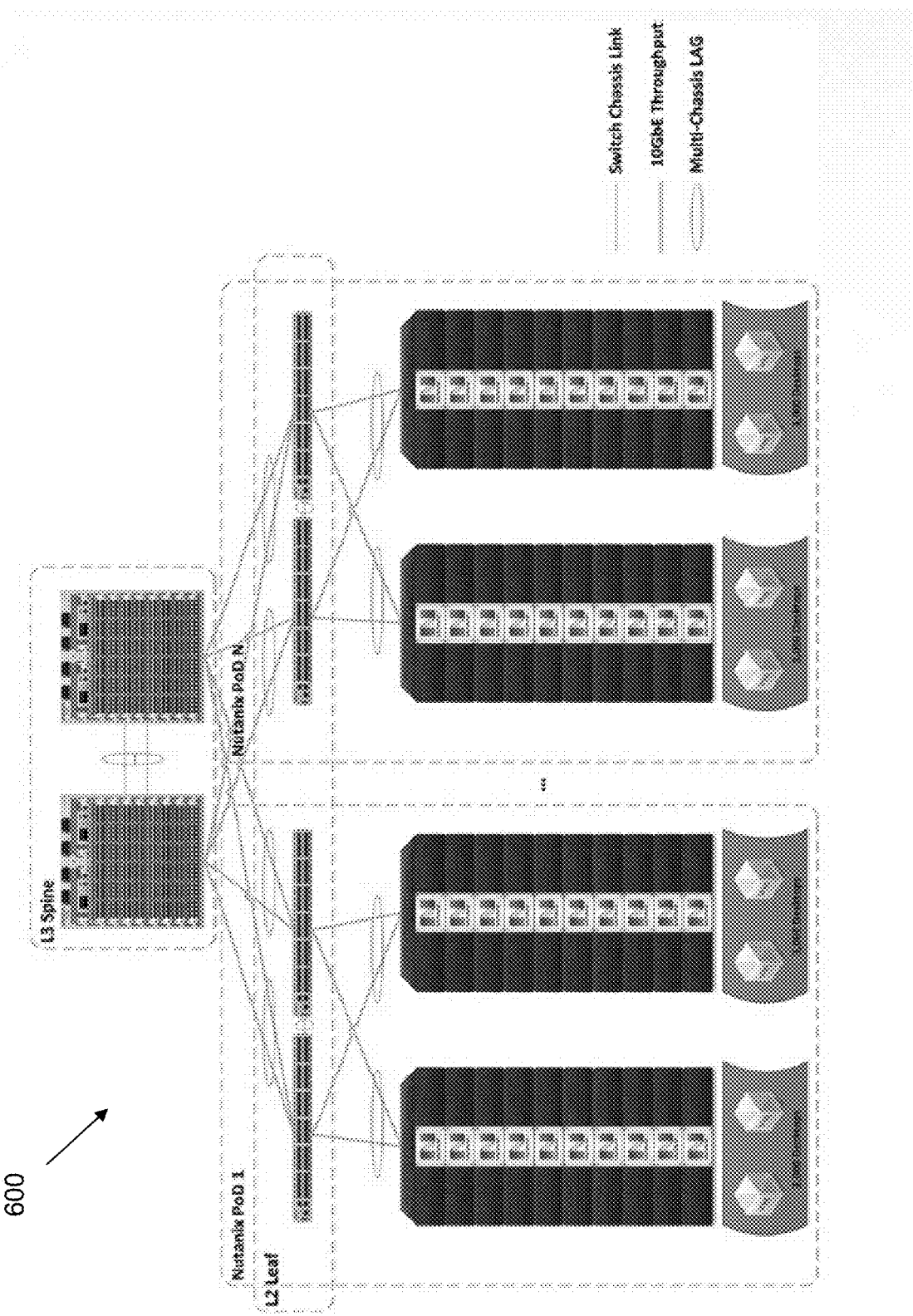
FIG. 6 illustrates a network configuration according to some embodiments of the invention.

The blocks are rackable as well, with the block being mountable on a standard 19" rack. FIG. 5 illustrates a cluster 500 of blocks/nodes on a rack that demonstrates the linear scalability of the present architecture from four nodes (one Block) to a much larger number of nodes. Multiple blocks may be placed on the same rack, interconnected using a networking component that also resides on the rack. FIG. 6 illustrates an example networking configuration 600 that can be used for multiple pods of blocks to scale to any number of desired virtualization capabilities. In this approach, one or more physical switches are used to interconnect the components on the rack component(s). However, communications are actually fulfilled using a virtual switch technology to address the virtualization components. This allows the components to share a small number (e.g., one) of "fat" pipes to handle the messaging traffic.

Figure 7A:
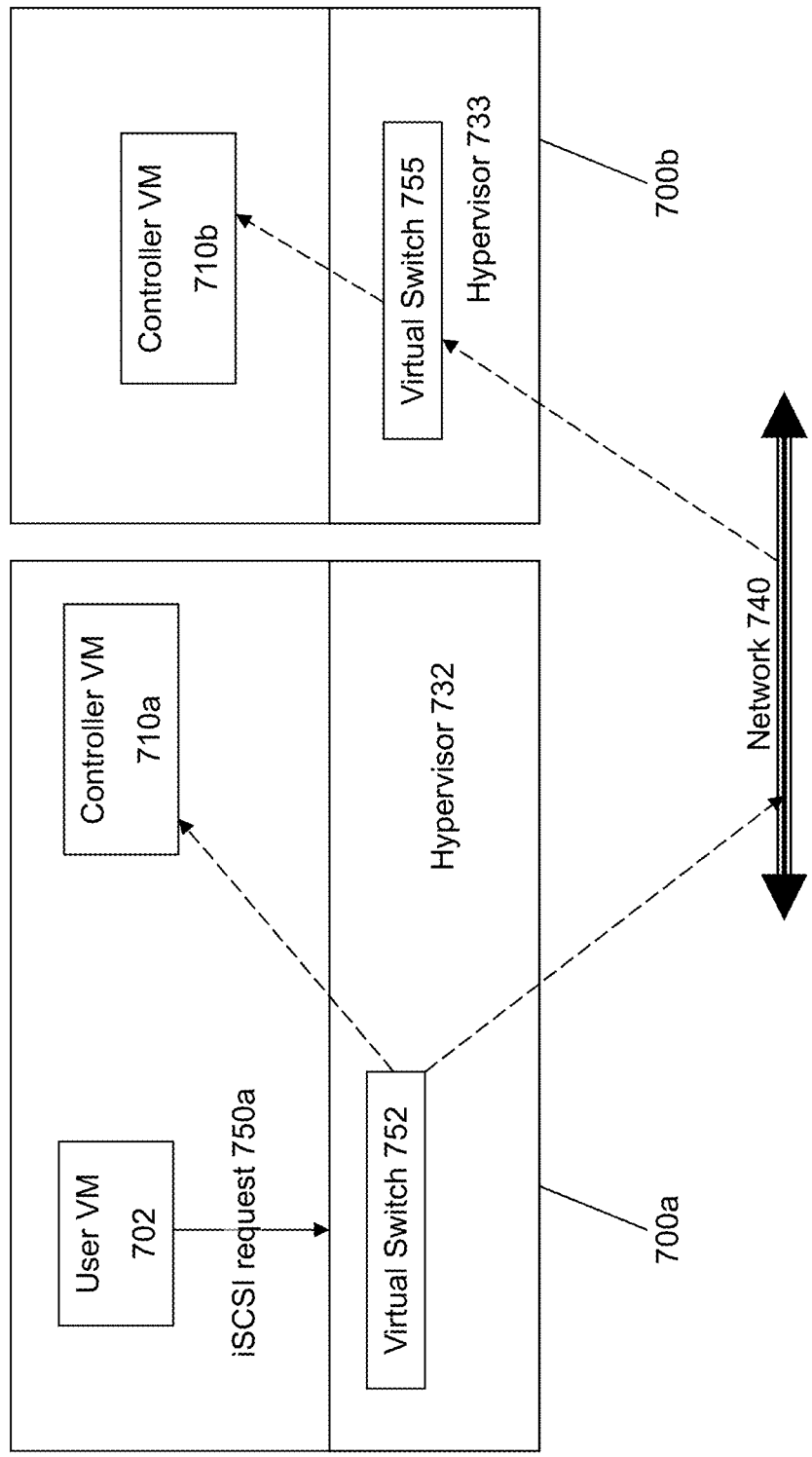
FIGS. 7A-C show alternate approaches to implement I/O requests according to some embodiments of the invention.

FIG. 7A illustrates an example approach that can be taken in some embodiments of the invention to use virtual switches to communicate to/from the Controller VMs 710a/710b on the different nodes. In this approach, the user VM 702 sends I/O requests 750a to the Controller VMs in the form of iSCSI or NFS requests. The term "iSCSI" or "Internet Small Computer System Interface" refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In another embodiment of the invention, the user VM 702 sends I/O requests 750b to the Controller VMs in the form of NFS requests. The term "NFS" or "Network File System" interface refers to an IP-based file access standard in which NFS clients send file-based requests to NFS servers via a proxy folder (directory) called "mount point". Going forward, this disclosure will interchangeably use the term iSCSI and NFS to refer to the IP-based protocol used to communicate between the hypervisor and the Controller VM. Note that while both protocols are network-based, the currently described architecture makes it possible to use them over the virtual network within the hypervisor. No iSCSI or NFS packets will need to leave the machine, because the communication—the request and the response—begins and ends within the single hypervisor host.

Here, the user VM 702 structures its I/O requests into the iSCSI format. The iSCSI or NFS request 750a designates the IP address for a Controller VM from which the user VM 702 desires I/O services. The iSCSI or NFS request 750a is sent from the user VM 702 to a virtual switch 752 within hypervisor 752 to be routed to the correct destination. If the request is to be intended to be handled by the Controller VM 710a within the same server 700a, then the iSCSI or NFS request 750a is internally routed within server 700a to the Controller VM 710a. As described in more detail below, the Controller VM 710a includes structures to properly interpret and process that request 750a.

It is also possible that the iSCSI or NFS request 750a will be handled by a Controller VM 710b on another server 700b. In this situation, the iSCSI or NFS request 750a will be sent by the virtual switch 752 to a real physical switch to be sent across network 740 to the other server 700b. The virtual switch 755 within the hypervisor 733 on the server 733 will then route the request 750a to the Controller VM 710b for further processing.

Figure 7B:
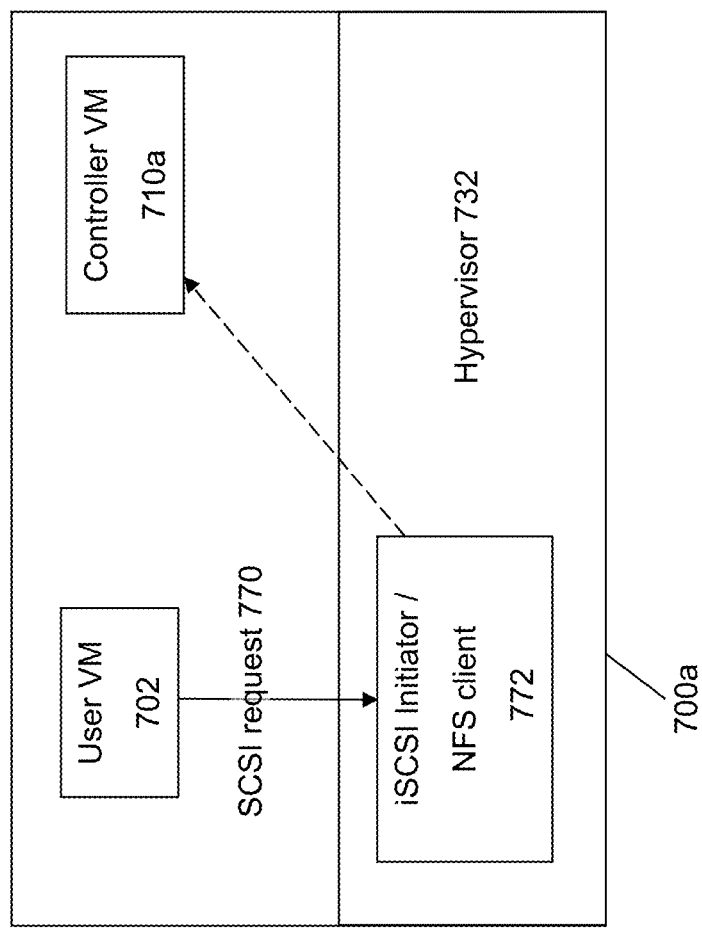

FIG. 7B illustrates an alternate approach in which the I/O requests from the user VM 702 is in the normal SCSI protocol to a storage device. The hypervisor then converts this SCSI request into an iSCSI or an NFS request as part of its hardware emulation layer. In other words, the virtual SCSI disk attached to the user VM is either an iSCSI LUN or an NFS file in an NFS server. In this approach, an iSCSI initiator 772 or the NFS client software is employed to convert the SCSI-formatted requests into the appropriate iSCSI- or NFS-formatted requests that can be handled by the Controller VM 710*a*. The advantage of this approach over the approach of FIG. 7A is that there is no need to individually reconfigure or make sure that the software for the user VMs 702 can work with the iSCSI or NFS protocol.

According to some embodiments, the controller VM runs the Linux operating system. As noted above, since the controller VM exports a block-device or file-access interface to the user VMs, the interaction between the user VMs and the controller VMs follows the iSCSI or NFS protocol, either directly or indirectly via the hypervisor's hardware emulation layer.

Figure 7C:
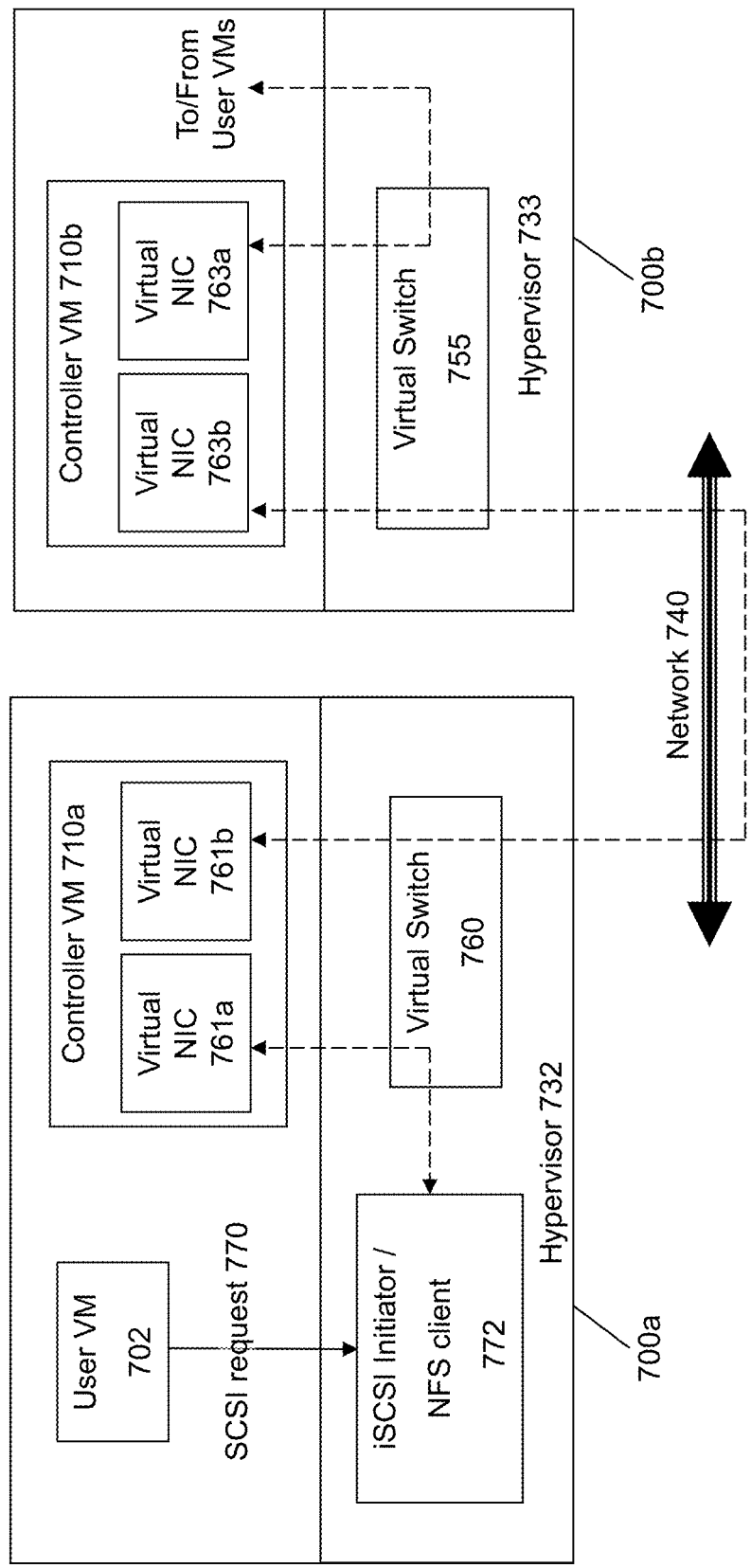

For easy management of the appliance, the Controller VMs all have the same IP address isolated by internal VLANs (virtual LANs in the virtual switch of the hypervisor). FIG. 7C illustrates this aspect of the architecture. The Controller VM 710*a* on node 700*a* implements two virtual network interface cards (NICs) 761*a* and 761*b*. One of the virtual NICs 761*a* corresponds to an internal VLAN that permits the User VM 702 to communicate with the Controller VM 710*a* using the common IP address. The virtual switch 760 would therefore route all communications internal to the node 700*a* between the User VM 702 and the Controller VM 710*a* using the first virtual NIC 761*a*, where the common IP address is managed to correspond to the Controller VM 710*a* due to its membership in the appropriate VLAN.

The second virtual NIC 761*b* is used to communicate with entities external to the node 700*a*, where the virtual NIC 761*b* is associated with an IP address that would be specific to Controller VM 710*a* (and no other controller VM). The second virtual MC 761*b* is therefore used to allow Controller VM 710*a* to communicate with other controller VMs, such as Controller VM 710*b* on node 700*b*. It is noted that Controller VM 710*b* would likewise utilize VLANs and multiple virtual NICs 763*a* and 763*b* to implement management of the appliance.

Figure 8:
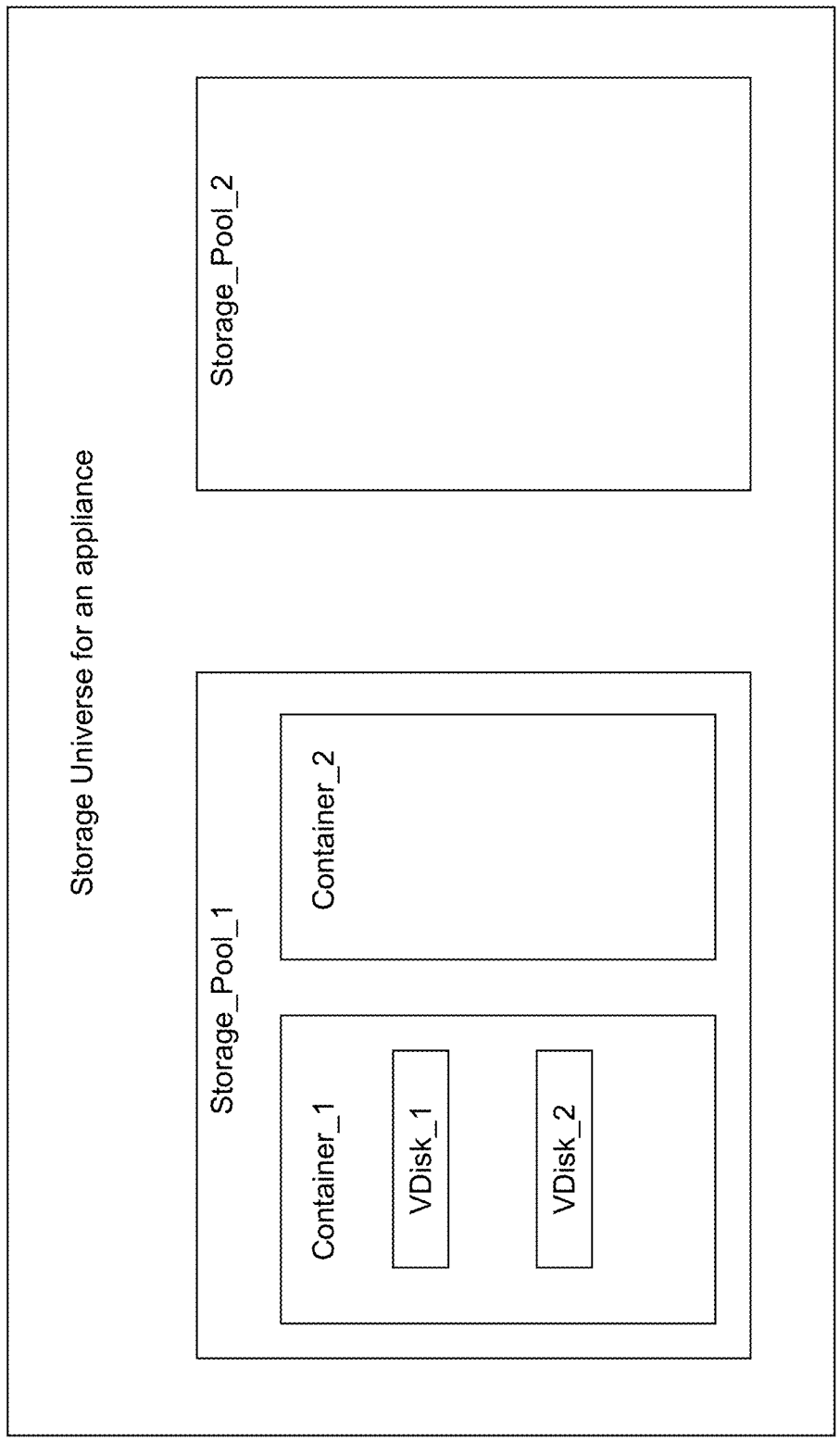
FIG. 8 illustrates a storage hierarchy according to some embodiments of the invention.

For easy management of the appliance, the storage is divided up into abstractions that have a hierarchical relationship to each other. FIG. 8 illustrates the storage hierarchy of the storage objects according to some embodiments of the invention, where all storage in the storage appliance collectively forms a Storage Universe. These storage devices may encompass any suitable devices, such as SSDs, HDDs on the various servers ("server-internal" or local storage), SAN, and Cloud storage.

Storage with similar characteristics is classified into tiers. Thus, all SSDs can be classified into a first tier and all HDDs may be classified into another tier etc. In a heterogeneous system with different kinds of HDDs, one may classify the disks into multiple HDD tiers. This action may similarly be taken for SAN and cloud storage.

The storage universe is divided up into storage pools—essentially a collection of specific storage devices. An administrator may be responsible for deciding how to divide up the storage universe into storage pools. For example, an administrator may decide to just make one storage pool with all the disks in the storage universe in that pool. However, the principal idea behind dividing up the storage universe is to provide mutual exclusion—fault isolation, performance isolation, administrative autonomy—when accessing the disk resources.

This may be one approach that can be taken to implement QoS techniques. For example, one rogue user may result in an excessive number of random IO activity on a hard disk—thus if other users are doing sequential IO, they still might get hurt by the rogue user. Enforcing exclusion (isolation) through storage pools might be used to provide hard guarantees for premium users. Another reason to use a storage pool might be to reserve some disks for later use (field replaceable units, or "FRUs").

As noted above, the Controller VM is the primary software component within the server that virtualizes I/O access to hardware resources within a storage pool according to embodiments of the invention. This approach essentially provides for a separate and dedicated controller for each and every node within a virtualized data center (a cluster of nodes that run some flavor of hypervisor virtualization software), since each node will include its own Controller VM. This is in contrast to conventional storage architectures that provide for a limited number of storage controllers (e.g., four controllers) to handle the storage workload for the entire system, and hence results in significant performance bottlenecks due to the limited number of controllers. Unlike the conventional approaches, each new node will include a Controller VM to share in the overall workload of the system to handle storage tasks. Therefore, the current approach is infinitely scalable, and provides a significant advantage over the conventional approaches that have a limited storage processing power. Consequently, the currently described approach creates a massively-parallel storage architecture that scales as and when hypervisor hosts are added to a datacenter.

Figure 9:
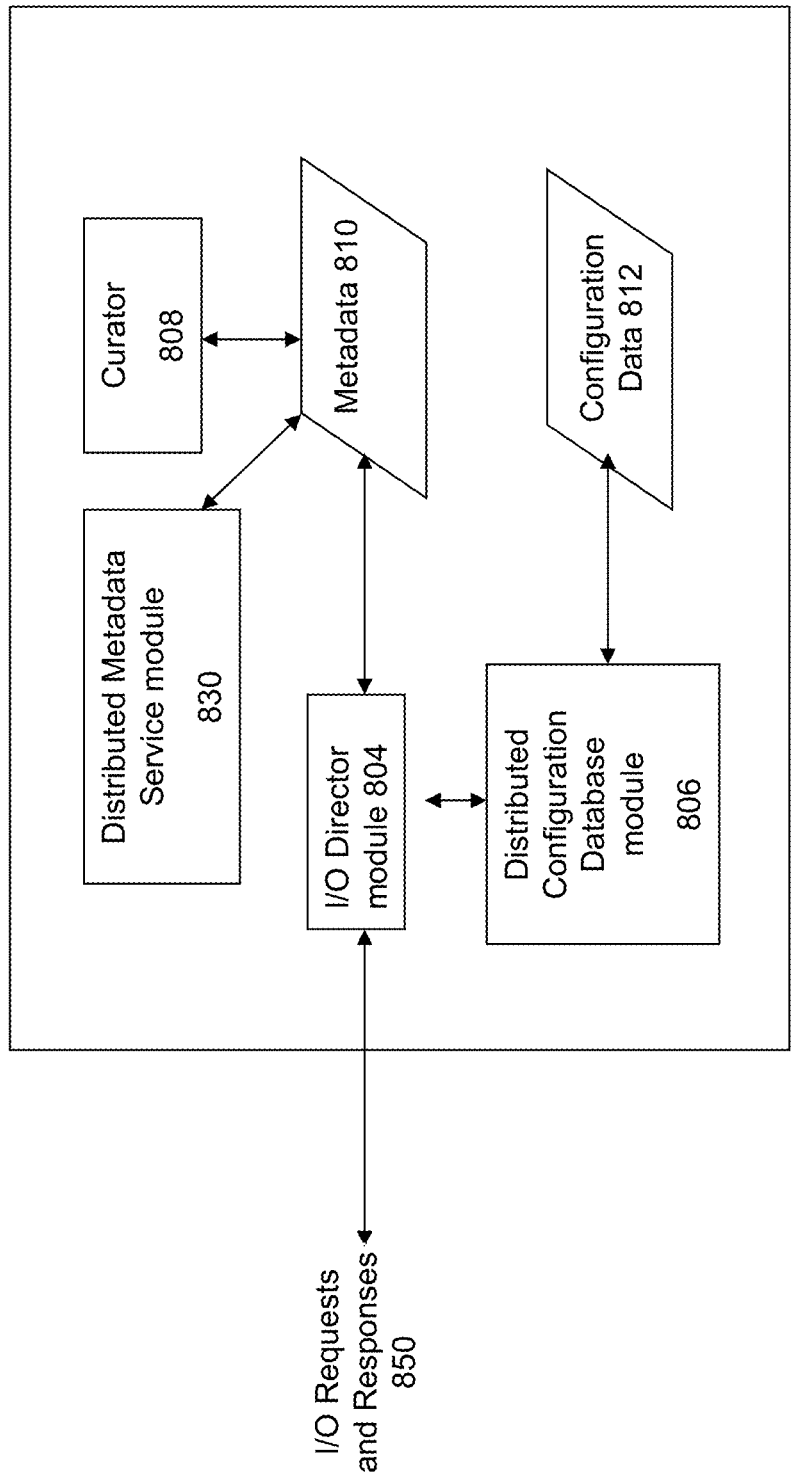
FIG. 9 illustrates the components of a Controller VM according to some embodiments of the invention.

FIG. 9 illustrates the internal structures of a Controller VM according to some embodiments of the invention. As previously noted, the Controller VMs are not formed as part of specific implementations of hypervisors. Instead, the Controller VMs run as virtual machines above hypervisors on the various nodes. Since the Controller VMs run above the hypervisors, this means that the current approach can be used and implemented within any virtual machine architecture, since the Controller VMs of embodiments of the invention can be used in conjunction with any hypervisor from any virtualization vendor. Therefore, the Controller VM can be configured to operate ubiquitously anywhere within the computing environment, and will not need to be custom-configured for each different type of operating environment. This is particularly useful because the industry-standard iSCSI or NFS protocols allow the Controller VM to be hypervisor-agnostic.

The main entry point into the Controller VM is the central controller module 804 (which is referred to here as the "I/O Director module 804"). The term I/O Director module is used to connote that fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the controller VM's kernel. This write would be intercepted by the I/O Director module 804 running in user space. I/O Director module 804 interprets the iSCSI LUN or the NFS file destination and converts the request into an internal "vDisk" request (e.g., as described in more detail below). Ultimately, the I/O Director module 804 would write the data to the physical storage.

Each vDisk managed by a Controller VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 810 is maintained by the Controller VM to track and handle the vDisks and the data and storage objects in the system that pertain to the vDisks. The Metadata 810 is used to track and maintain the contents of the vDisks and vDisk blocks.

In order to determine where to write and read data from the storage pool, the I/O Director module 804 communicates with a Distributed Metadata Service module 830 that maintains all the metadata 810. In some embodiments, the Distributed Metadata Service module 830 is a highly available, fault-tolerant distributed service that runs on all the Controller VMs in the appliance. The metadata managed by Distributed Metadata Service module 830 is itself kept on the persistent storage attached to the appliance. According to some embodiments of the invention, the Distributed Metadata Service module 830 may be implemented on SSD storage.

Since requests to the Distributed Metadata Service module 830 may be random in nature, SSDs can be used on each server node to maintain the metadata for the Distributed Metadata Service module 830. The Distributed Metadata Service module 830 stores the metadata that helps locate the actual content of each vDisk block. If no information is found in Distributed Metadata Service module 830 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Further details regarding methods and mechanisms for implementing a Controller VM are described below and in U.S. Pat. No. 8,601,473, issued on Dec. 3, 2013, which is hereby incorporated by reference in its entirety. Further details regarding methods and mechanisms for implementing Metadata 910 are described below and in U.S. Pat. No. 8,850,130, issued on Sep. 30, 2014, which is hereby incorporated by reference in its entirety.

A health management module 808 (which may hereinafter be referred to as a "Curator") is employed to address and cure any inconsistencies that may occur with the Metadata 810. The Curator 808 oversees the overall state of the virtual storage system, and takes actions as necessary to manage the health and efficient performance of that system. According to some embodiments of the invention, the curator 808 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 808 are disclosed in U.S. Pat. No. 8,549,518, issued on Oct. 1, 2013, which is hereby incorporated by reference in its entirety.

Some of the Controller VMs also includes a Distributed Configuration Database module 806 to handle certain administrative tasks. The primary tasks performed by the Distributed Configuration Database module 806 are to maintain configuration data 812 for the Controller VM and act as a notification service for all events in the distributed system. Examples of configuration data 812 include, for example, (1) the identity and existence of vDisks; (2) the identity of Controller VMs in the system; (3) the physical nodes in the system; and (4) the physical storage devices in the system. For example, assume that there is a desire to add a new physical disk to the storage pool. The Distributed Configuration Database module 806 would be informed of the new physical disk, after which the configuration data 812 is updated to reflect this information so that all other entities in the system can then be made aware for the new physical disk. In a similar way, the addition/deletion of vDisks, VMs and nodes would handled by the Distributed Configuration Database module 806 to update the configuration data 812 so that other entities in the system can be made aware of these configuration changes.

Another task that is handled by the Distributed Configuration Database module 806 is to maintain health information for entities in the system, such as the Controller VMs. If a Controller VM fails or otherwise becomes unavailable, then this module tracks this health information so that any management tasks required of that failed Controller VM can be migrated to another Controller VM.

The Distributed Configuration Database module 806 also handles elections and consensus management within the system. Another task handled by the Distributed Configuration Database module is to implement ID creation. Unique IDs are generated by the Distributed Configuration Database module as needed for any required objects in the system, e.g., for vDisks, Controller VMs, extent groups, etc. In some embodiments, the IDs generated are 64-bit IDs, although any suitable type of IDs can be generated as appropriate for embodiment so the invention. According to some embodiments of the invention, the Distributed Configuration Database module 806 may be implemented on an SSD storage because of the real-time guarantees required to monitor health events.

Figure 10:
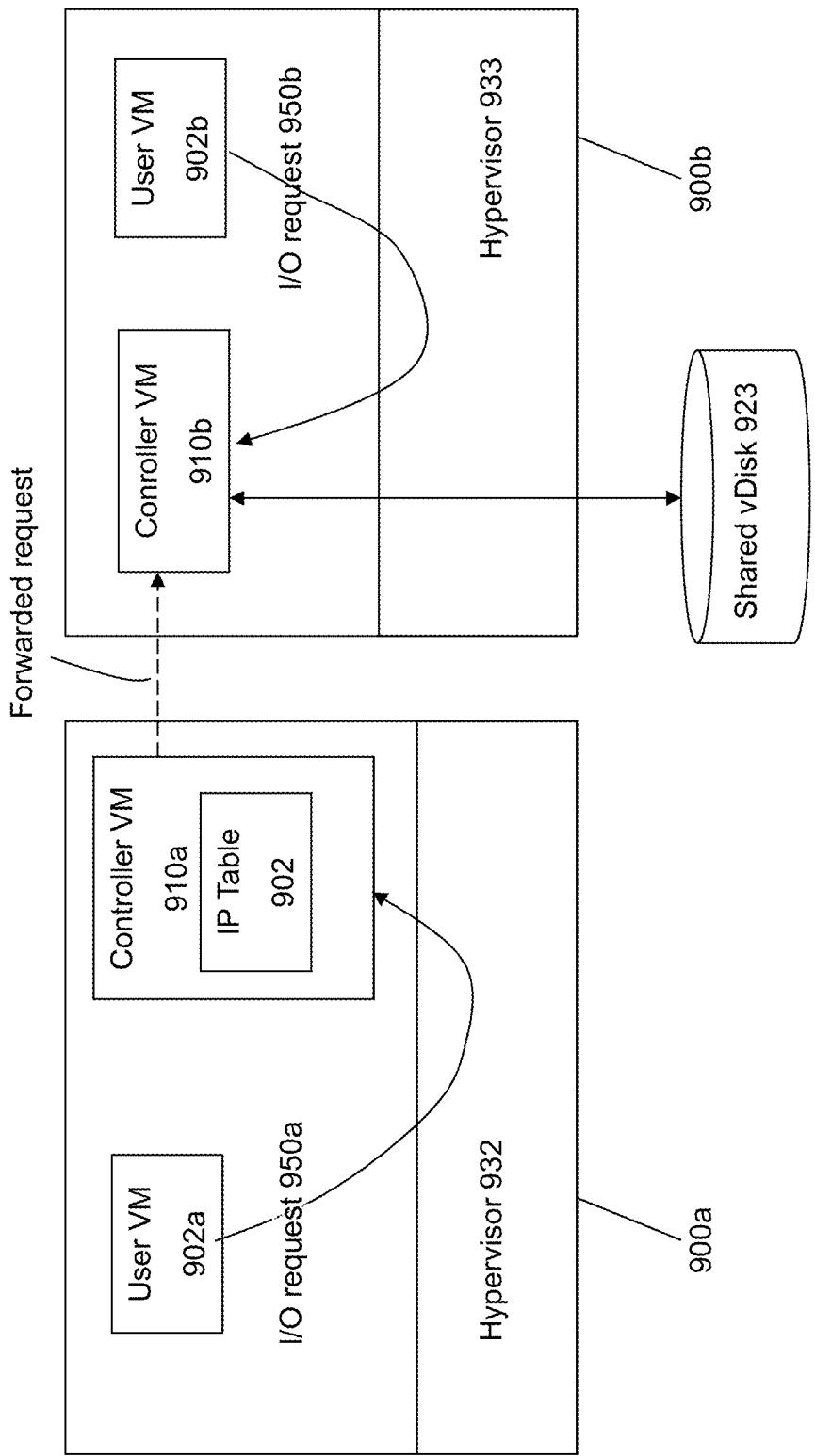
FIG. 10 illustrates shared vDisks according to some embodiments of the invention.

The vDisks can either be unshared (read and written by a single user VM) or shared (accessed by multiple user VMs or hypervisors) according to embodiments of the invention. FIG. 10 illustrates the shared vDisk scenario, in which a vDisk 923 can be accessed by multiple user VMs 902*a* and 902*b* on different server nodes 900*a* and 900*b*, respectively. In the example of FIG. 9, the shared vDisk 923 is owned by Controller VM 910*b* on server node 900*b*. Therefore, all I/O requests for vDisk 923 will be directed to this Controller VM 910*b* using standard IP forwarding (Network Address Translation) rules in the networking stack of the Controller VMs.

For I/O requests 950*b* from a user VM 902*b* that resides on the same server node 900*b*, the process to handle the I/O requests 950*b* is straightforward, and is conducted as described above. Essentially, the I/O request is in the form of an iSCSI or NFS request that is directed to a given IP address. The IP address for the I/O request is common for all the Controller VM on the different server nodes, but VLANs allows the IP address of the iSCSI or NFS request to be private to a particular (local) subnet, and hence the I/O request 950*b* will be sent to the local Controller VM 910*b* to handle the I/O request 950*b*. Since local Controller VM 910*b* recognizes that it is the owner of the vDisk 923 which is the subject of the I/O request 950*b*, the local Controller VM 910*b* will directly handle the I/O request 950*b*.

Consider the situation if a user VM 902*a* on a server node 900*a* issues an I/O request 950*a* for the shared vDisk 923, where the shared vDisk 923 is owned by a Controller VM 910*b* on a different server node 900*b*. Here, the I/O request 950*a* is sent as described above from the user VM 902*a* to its local Controller VM 910*a*. However, the Controller VM 910*a* will recognize that it is not the owner of the shared vDisk 923. Instead, the Controller VM 910*a* will recognize that Controller VM 910*b* is the owner of the shared vDisk 923. In this situation, the I/O request will be forwarded from Controller VM 910*a* to Controller VM 910*b* so that the owner (Controller VM 910b) can handle the forwarded I/O request. To the extent a reply is needed, the reply would be sent to the Controller VM 910a to be forwarded to the user VM 902a that had originated the I/O request 950a.

In some embodiments, an IP table 902 (e.g., a network address table or "NAT") is maintained inside the Controller VM 910a. The IP table 902 is maintained to include the address of the remote Server VMs. When the local Controller VM 910a recognizes that the I/O request needs to be sent to another Controller VM 910b, the IP table 902 is used to look up the address of the destination Controller VM 910b. This "NATing" action is performed at the network layers of the OS stack at the Controller VM 910a, when the local Controller VM 910a decides to forward the IP packet to the destination Controller VM 910b.

Figure 11:
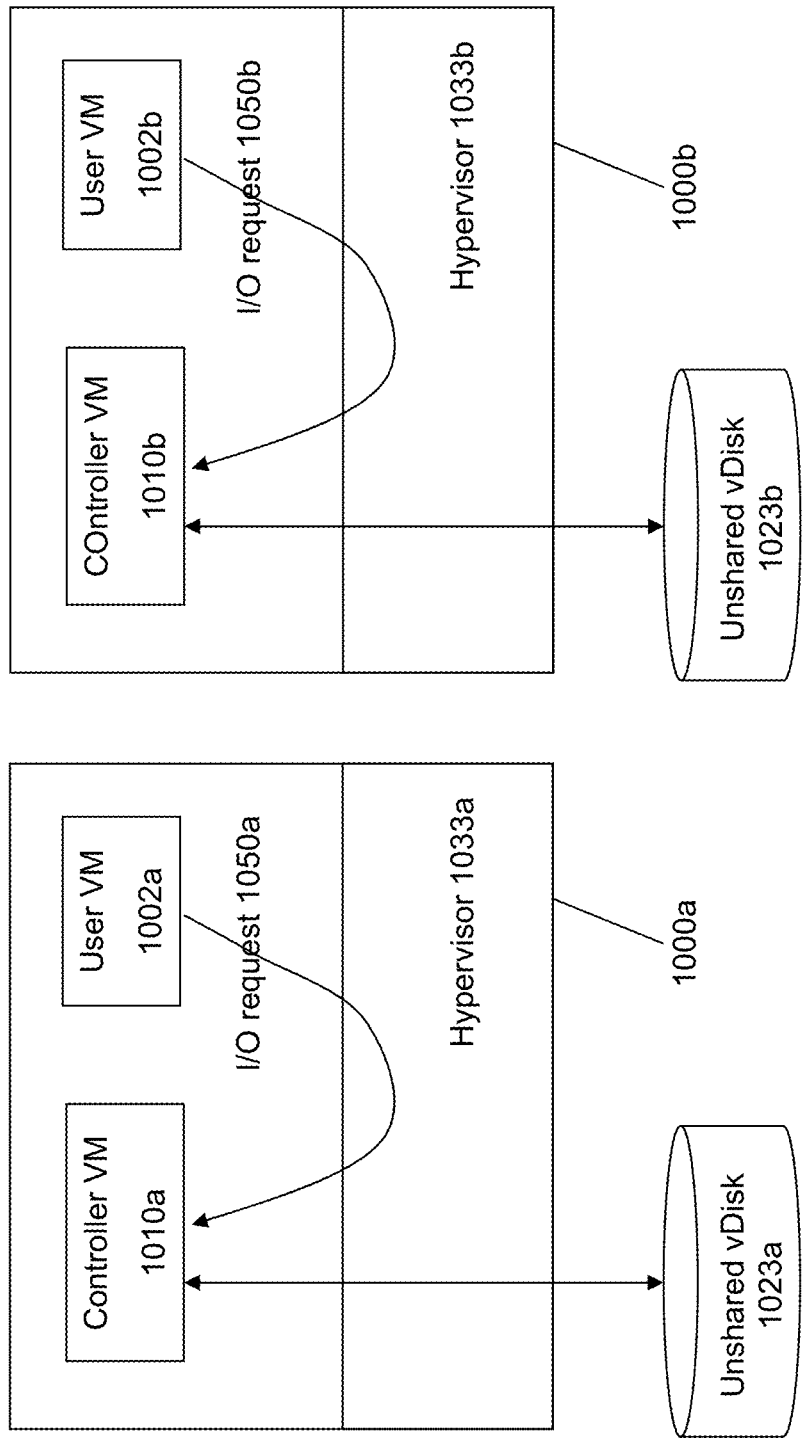
FIG. 11 illustrates shared-nothing vDisks according to some embodiments of the invention.

FIG. 11 shows an example of a "shared nothing" system, in which the vDisks 1023a and 1023b are un-shared vDisks. Therefore, each vDisk in the shared nothing system will be accessed by at most one user VM. Here, vDisk 1023a is un-shared and is accessed only by user VM 1002a on server node 1000a. Similarly, vDisk 1023b is un-shared and is accessed only by user VM 1002b on server node 1000b.

Each un-shared vDisk is owned by the Controller VM that is local to the user VM which accesses that vDisk on the shared-nothing basis. In the current example, vDisk 1023a is owned by Controller VM 1010a since this Controller VM is on the same server node 1000a as the user VM 1002a that accesses this vDisk. Similarly, vDisk 1023b is owned by Controller VM 1010b since this Controller VM is on the same server node 1000b as the user VM 1002b that accesses this vDisk.

I/O requests 1050a that originate user VM 1002a would therefore be handled by its local Controller VM 1023a on the same server node 1000a. Similarly, I/O requests 1050b that originate user VM 1002b would therefore be handled by its local Controller VM 1023b on the same server node 1000b. This is implemented using the same approach previously described above, in which the I/O request in the form of an iSCSI or NFS request is directed to a given IP address, and where VLANs allows the IP address of the iSCSI or NFS request to be private to a particular (local) subnet where the I/O request 950b will be sent to the local Controller VM to handle the I/O request. Since local Controller VM recognizes that it is the owner of the vDisk which is the subject of the I/O request, the local Controller VM will directly handle the I/O request.

It is possible that a user VM will move or migrate from one node to another node. Various virtualization vendors have implemented virtualization software that allows for such movement by user VMs. For shared vDisks, this situation does not necessarily affect the configuration of the storage system, since the I/O requests will be routed to the owner Controller VM of the shared vDisk regardless of the location of the user VM. However, for unshared vDisks, movement of the user VMs could present a problem since the I/O requests are handled by the local Controller VMs.

Therefore, what has been described is an improved architecture that enables significant convergence of the components of a system to implement virtualization. The infrastructure is VM-aware, and permits SOCS provisioning to allow storage on a per-VM basis, while identifying I/O coming from each VM. The current approach can scale out from a few nodes to a large number of nodes. In addition, the inventive approach has ground-up integration with all types of storage, including solid-state drives. The architecture of the invention provides high availability against any type of failure, including disk or node failures. In addition, the invention provides high performance by making I/O access local, leveraging solid-state drives and employing a series of patent-pending performance optimizations.

System Architecture

Figure 12:
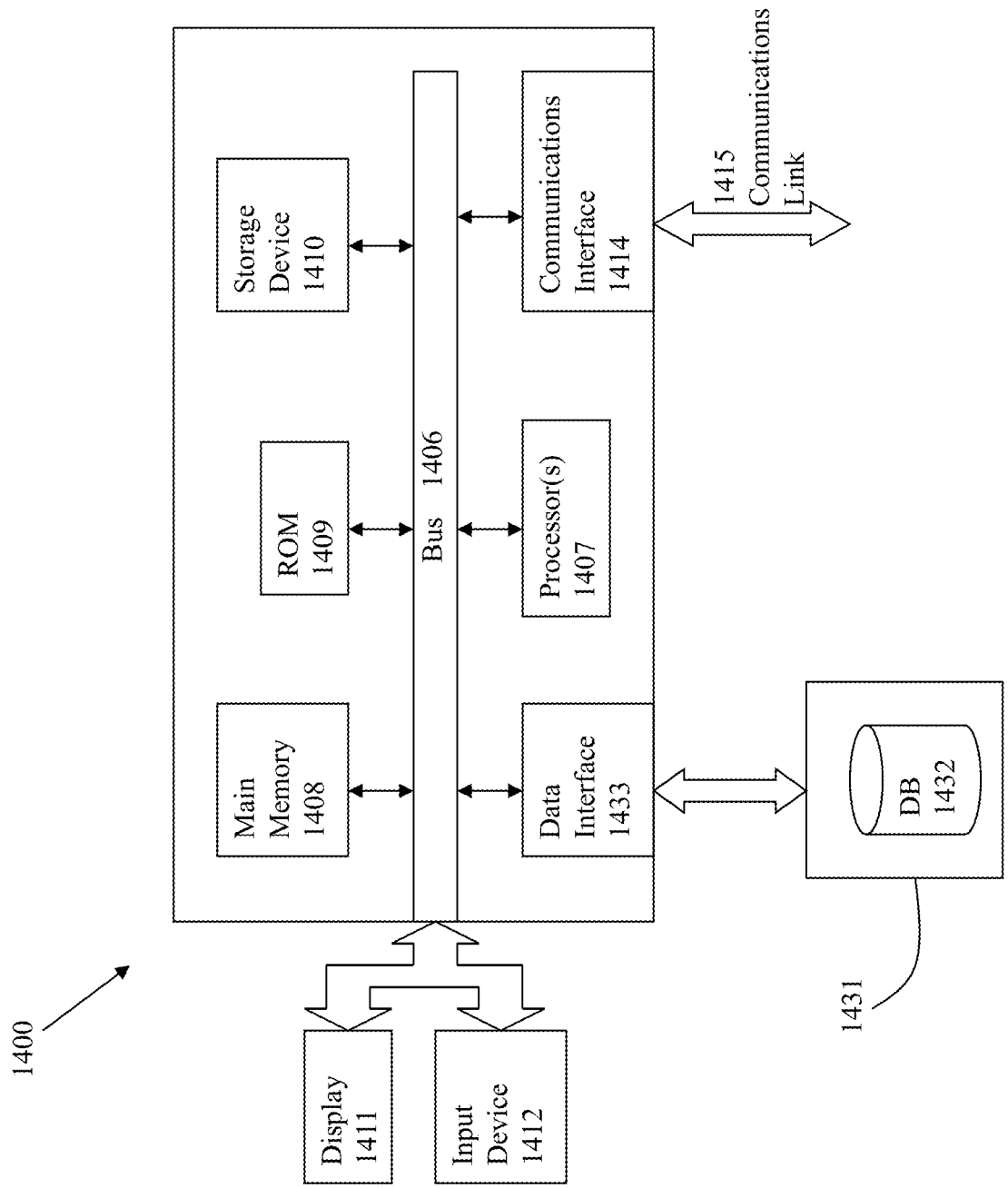
FIG. 12 is a block diagram of a computing system suitable for implementing an embodiment of the present invention.

FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system, comprising:
multiple nodes, a node of the multiple nodes comprising:
a user virtual machine;
a hypervisor;
a serverboard insertable into the system and corresponding to the node; and
a controller virtual machine running as a virtual machine above the hypervisor and managing a storage pool for the system at least by receiving, via the hypervisor, a storage request sent by the user virtual machine;
a distributed virtual controller infrastructure that further comprises multiple controller virtual machines that are coupled with each other, wherein the distributed controller infrastructure eliminates a need for network storage; and
a local storage device coupled to the serverboard, wherein the multiple controller virtual machines for the multiple nodes are coupled with each other to create the storage pool comprising the local storage device, and
the system is operatively coupled to another system to form a virtualization system.

2. The system of claim 1, wherein the controller virtual machine is configured to receive a storage request from the user virtual machine on the node based at least in part upon a destination identification of the storage pool, and the storage request includes information of the destination identification that corresponds to the storage pool.

3. The system of claim 1, further comprising a backplane connecting each node of the multiple nodes to a plurality of storage devices.

4. The system of claim 1, further comprising a plurality of storage devices, wherein the plurality of storage devices comprises solid state drives (SSD), hard disk drives (HDD), and cloud storage, and networked storage appliances.

5. The system of claim 1, wherein the is configured to determine the controller virtual machine from the multiple controller virtual machines for processing a storage request.

6. The system of claim 1, further comprising a plurality of storage devices, and multiple storage devices of the plurality of storage devices with similar characteristics are classified into different tiers.

7. The system of claim 1, wherein input-output (I/O) performance is faster when accessing the local storage device as compared to the I/O performance when accessing networked storage.

8. The system of claim 1, wherein the storage pool comprises a scale-out converged storage (SOCS), and the SOCS uses a local solid-state drive and a hard disk drive of the multiple nodes to store virtual machine data.

9. The system of claim 1, wherein the multiple controller virtual machines are communicably coupled with each other to form a single distributed system for the storage pool.

10. The system of claim 1, wherein the system is configured to scale a storage or compute infrastructure in the system at least by adding an additional node having an additional serverboard to the system.

11. The system of claim 1, further comprising a plurality of power supplies providing power redundancy to the system.

12. The system of claim 1, wherein the multiple controller virtual machines have a same IP address isolated by an internal virtual local area network in a virtual switch of the hypervisor.

13. The system of claim 1, wherein the controller virtual machine is not formed as a part of the hypervisor.

14. The system of claim 13, wherein the controller virtual machine is hypervisor-agnostic.

15. The system of claim 1, further comprising a clustered storage appliance that comprises a plurality of block devices or server targets and is exported by the controller virtual machine.

16. The system of claim 1, wherein the controller virtual machines form a distributed virtual controller infrastructure that is scaled at least by adding at least one additional node to the multiple nodes and an additional controller virtual machine for the at least one additional node, and the additional controller virtual machine is further coupled with the controller virtual machines of the multiple nodes to scale the distributed virtual controller infrastructure.

17. The system of claim 1, wherein the system is configured to performed a set of acts, and the set of acts comprises:
processing the storage request at the controller virtual machine or at another controller virtual machine least by routing the storage request based at least in part upon a destination specification for the controller virtual machine, wherein the storage request comprises the destination specification.

18. An appliance, comprising:
multiple nodes, a node of the multiple nodes comprising:
a user virtual machine;
a hypervisor;
a serverboard insertable into the appliance and corresponding to the node; and
a controller virtual machine running as a virtual machine above the hypervisor and managing a storage pool for the appliance at least by receiving, via the hypervisor, a storage request sent by the user virtual machine; and
a local storage device coupled to the serverboard, wherein controller virtual machines for the multiple nodes are communicably coupled with each other to create the storage pool comprising the local storage device, and
the system is operatively coupled to another system to form a virtualization system, wherein the appliance is configured to performed a set of acts, and the set of acts comprises:
receiving, at the hypervisor, the storage request from the user virtual machine that is structured by the user virtual machine in a first storage protocol;
converting, by the hypervisor, the storage request into a modified storage request in a second storage protocol for the controller virtual machine;
routing the modified storage request from the hypervisor to the controller virtual machine; and
interpreting and processing the modified storage request at the controller virtual machine.

19. The appliance of claim 18, further comprising a storage universe, wherein the storage universe is divided into multiple storage pools including the storage pool and a different storage pool.

20. The appliance of claim 18, wherein the controller virtual machines form a distributed controller that manages the storage pool for the multiple nodes in the virtualization system.

* * * * *